(12) United States Patent
Welch et al.

(10) Patent No.: US 11,422,374 B2
(45) Date of Patent: Aug. 23, 2022

(54) METHODS AND SYSTEM FOR CREATING FOCAL PLANES IN VIRTUAL AND AUGMENTED REALITY

(71) Applicant: MAGIC LEAP, INC., Plantation, FL (US)

(72) Inventors: William Hudson Welch, Fort Lauderdale, FL (US); Robert D. Tekolste, Fort Lauderdale, FL (US); Hyunsun Chung, Weston, FL (US); Hui-Chuan Cheng, Cooper City, FL (US)

(73) Assignee: Magic Leap, Inc., Plantation, FL (US)

( * ) Notice: Subject to any disclaimer, the term of this patent is extended or adjusted under 35 U.S.C. 154(b) by 29 days.

(21) Appl. No.: 16/794,513

(22) Filed: Feb. 19, 2020

(65) Prior Publication Data

US 2020/0183172 A1 Jun. 11, 2020

Related U.S. Application Data

(63) Continuation of application No. 16/261,455, filed on Jan. 29, 2019, now Pat. No. 10,627,632, which is a (Continued)

(51) Int. Cl.
*G02B 27/01* (2006.01)
*G06F 3/01* (2006.01)
(Continued)

(52) U.S. Cl.
CPC ....... *G02B 27/0172* (2013.01); *G02B 27/017* (2013.01); *G06F 3/012* (2013.01);
(Continued)

(58) Field of Classification Search
CPC ............. G06F 3/014; G02B 27/0172; G02B 2027/014; G02B 27/0101; G02B 27/0093
See application file for complete search history.

(56) References Cited

U.S. PATENT DOCUMENTS 4,472,737 A 9/1984 Iwasaki
4,909,613 A 3/1990 Kikuchi
(Continued)

FOREIGN PATENT DOCUMENTS

AU 2015266585 5/2015
AU 2015266670 5/2015
(Continued)

OTHER PUBLICATIONS

Non-Final Office Action for U.S. Appl. No. 14/611,154, dated Mar. 28, 2017.
(Continued)

*Primary Examiner* — Lixi C Simpson
(74) *Attorney, Agent, or Firm* — Vista IP Law Group, LLP

(57) ABSTRACT

Configurations are disclosed for presenting virtual reality and augmented reality experiences to users. The system may comprise a spatial light modulator operatively coupled to an image source for projecting light associated with one or more frames of image data, and a variable focus element (VFE) for varying a focus of the projected light such that a first frame of image data is focused at a first depth plane, and a second frame of image data is focused at a second depth plane, and wherein a distance between the first depth plane and the second depth plane is fixed.

34 Claims, 24 Drawing Sheets

Related U.S. Application Data continuation of application No. 15/819,887, filed on Nov. 21, 2017, now Pat. No. 10,234,687, which is a continuation of application No. 14/726,429, filed on May 29, 2015, now Pat. No. 9,857,591.

(60) Provisional application No. 62/005,834, filed on May 30, 2014.

(51) Int. Cl.
*G02B 3/14* (2006.01)
*G02B 26/00* (2006.01)

(52) U.S. Cl.
CPC ............... *G06F 3/013* (2013.01); *G02B 3/14* (2013.01); *G02B 26/005* (2013.01); *G02B 26/007* (2013.01); *G02B 2027/014* (2013.01); *G02B 2027/0107* (2013.01); *G02B 2027/0127* (2013.01); *G02B 2027/0134* (2013.01); *G02B 2027/0178* (2013.01); *G02B 2027/0185* (2013.01); *G02B 2027/0187* (2013.01); *G02B 2027/0194* (2013.01)

(56) References Cited

U.S. PATENT DOCUMENTS

| | | | |
|---|---|---|---|
| 5,729,242 | A | 3/1998 | Margerum et al. |
| 5,751,494 | A | 5/1998 | Takahashi |
| 5,764,317 | A | 6/1998 | Sadovnik et al. |
| 5,880,711 | A | 3/1999 | Tamada |
| 6,046,720 | A | 4/2000 | Melville et al. |
| 6,069,650 | A | 5/2000 | Battersby |
| 6,120,538 | A | 9/2000 | Rizzo et al. |
| 6,504,629 | B1 | 1/2003 | Popovich et al. |
| 7,077,523 | B2 | 7/2006 | Seo et al. |
| 7,428,001 | B2 | 9/2008 | Schowengerdt et al. |
| 7,555,333 | B2 | 6/2009 | Wang et al. |
| 7,616,382 | B2 | 11/2009 | Inoguchi et al. |
| 7,784,697 | B2 | 8/2010 | Johnston et al. |
| 8,248,458 | B2 | 8/2012 | Schowengerdt et al. |
| 8,259,164 | B2 | 9/2012 | Saito et al. |
| 8,317,330 | B2 | 11/2012 | Yamazaki et al. |
| 8,384,999 | B1 | 2/2013 | Crosby et al. |
| 8,757,812 | B2 | 6/2014 | Melville et al. |
| 9,348,143 | B2 | 5/2016 | Gao et al. |
| 9,740,006 | B2 | 8/2017 | Gao |
| 9,846,967 | B2 | 12/2017 | Schowengerdt |
| 9,857,591 | B2 * | 1/2018 | Welch ............... G06F 1/163 |
| 9,915,824 | B2 | 3/2018 | Schowengerdt et al. |
| 10,156,722 | B2 | 12/2018 | Gao et al. |
| 10,234,687 | B2 * | 3/2019 | Welch ............... G06F 3/013 |
| 10,317,690 | B2 | 6/2019 | Cheng |
| 10,848,740 | B2 | 11/2020 | Li et al. |
| 11,150,489 | B2 | 10/2021 | Cheng |
| 2001/0013960 | A1 | 8/2001 | Popovich et al. |
| 2002/0163482 | A1 * | 11/2002 | Sullivan ............... G06T 15/00 345/6 |
| 2003/0020879 | A1 | 1/2003 | Sonehara |
| 2004/0227703 | A1 | 11/2004 | Lamvik et al. |
| 2006/0012851 | A1 | 1/2006 | Wu et al. |
| 2006/0028400 | A1 * | 2/2006 | Lapstun ............... H04N 13/344 345/8 |
| 2006/0072843 | A1 | 4/2006 | Johnston |
| 2006/0120706 | A1 | 6/2006 | Cho et al. |
| 2008/0204394 | A1 | 8/2008 | Cho |
| 2008/0259463 | A1 | 10/2008 | Shepherd |
| 2008/0316610 | A1 | 12/2008 | Dobrusskin |
| 2009/0040138 | A1 | 2/2009 | Takahashi et al. |
| 2009/0316116 | A1 | 12/2009 | Melville et al. |
| 2010/0149073 | A1 * | 6/2010 | Chaum ............... G02B 27/0172 345/8 |
| 2010/0202054 | A1 | 8/2010 | Niederer |
| 2010/0289970 | A1 * | 11/2010 | Watanabe ............... G02B 15/00 348/745 |
| 2011/0075257 | A1 | 3/2011 | Hua et al. |
| 2011/0199582 | A1 | 8/2011 | Kuriki |
| 2012/0075534 | A1 | 3/2012 | Katz et al. |
| 2012/0081800 | A1 | 4/2012 | Cheng et al. |
| 2012/0105310 | A1 | 5/2012 | Sverdrup et al. |
| 2012/0113092 | A1 | 5/2012 | Bar-Zeev et al. |
| 2012/0162549 | A1 | 6/2012 | Gao et al. |
| 2012/0192991 | A1 | 8/2012 | Gupta et al. |
| 2013/0050832 | A1 | 2/2013 | Tohara et al. |
| 2013/0128230 | A1 | 5/2013 | Macnamara |
| 2013/0135299 | A1 | 5/2013 | Park et al. |
| 2013/0176628 | A1 | 7/2013 | Batchko et al. |
| 2013/0187836 | A1 | 7/2013 | Cheng et al. |
| 2013/0265647 | A1 * | 10/2013 | Kern ............... G02B 3/14 359/665 |
| 2013/0300635 | A1 | 11/2013 | White et al. |
| 2013/0314793 | A1 | 11/2013 | Robbins et al. |
| 2014/0009845 | A1 | 1/2014 | Cheng et al. |
| 2014/0035959 | A1 | 2/2014 | Lapstun |
| 2014/0063055 | A1 | 3/2014 | Osterhout et al. |
| 2014/0071539 | A1 | 3/2014 | Gao |
| 2014/0111616 | A1 | 4/2014 | Blayvas |
| 2014/0132501 | A1 | 5/2014 | Choi et al. |
| 2014/0168034 | A1 | 6/2014 | Luebke et al. |
| 2014/0184477 | A1 | 7/2014 | Hino et al. |
| 2014/0192078 | A1 | 7/2014 | Gilbert et al. |
| 2014/0266990 | A1 | 9/2014 | Makino et al. |
| 2015/0035880 | A1 | 2/2015 | Heide et al. |
| 2015/0205126 | A1 | 7/2015 | Schowengerdt |
| 2015/0222883 | A1 | 8/2015 | Welch |
| 2015/0222884 | A1 | 8/2015 | Cheng |
| 2015/0234191 | A1 | 8/2015 | Schowengerdt |
| 2015/0248012 | A1 | 9/2015 | Schowengerdt |
| 2015/0277129 | A1 | 10/2015 | Hua et al. |
| 2015/0346490 | A1 | 12/2015 | Tekolset et al. |
| 2015/0346495 | A1 | 12/2015 | Welch et al. |
| 2016/0011419 | A1 | 1/2016 | Gao |

FOREIGN PATENT DOCUMENTS

| | | |
|---|---|---|
| AU | 2019219728 | 7/2021 |
| EP | 0785457 A2 | 7/1997 |
| EP | 0785457 A3 | 7/1997 |
| EP | 1962130 A2 | 8/2008 |
| JP | 58-57108 | 4/1983 |
| JP | 8-166559 | 6/1996 |
| JP | 08-184783 | 7/1996 |
| JP | 2002-116410 | 4/2002 |
| JP | 2002-512408 | 4/2002 |
| JP | 2002-196280 | 7/2002 |
| JP | 2004-252429 | 9/2004 |
| JP | 2007-101790 | 4/2007 |
| JP | 2007-514190 | 5/2007 |
| JP | 2009-169142 | 7/2009 |
| JP | 2010-008948 | 1/2010 |
| JP | 2010-039219 | 2/2010 |
| JP | 2011-077764 | 4/2011 |
| JP | 2014-505381 | 2/2014 |
| JP | 2014-092696 | 5/2014 |
| KR | 10-2008-0079005 | 8/2008 |
| KR | 10-2013-0139280 | 12/2013 |
| WO | WO 02/086590 | 10/2002 |
| WO | WO 2006017771 | 2/2006 |
| WO | WO 2006/070308 | 7/2006 |
| WO | WO 20090014525 | 1/2009 |
| WO | WO 2011/074572 | 6/2011 |
| WO | WO 2011/134169 | 11/2011 |
| WO | WO 2012/088478 | 6/2012 |
| WO | WO 2013/049248 | 4/2013 |
| WO | WO 2013/162977 | 10/2013 |
| WO | WO 2014/062912 | 4/2014 |
| WO | WO 2014053194 | 4/2014 |

OTHER PUBLICATIONS

Final Office Action dated Jul. 26, 2017 for U.S. Appl. No. 14/611,154.
PCT International Search Report and Written Opinion for International Application No. PCT/US15/13993, Applicant Magic Leap, Inc., dated Jun. 10, 2015, 7 pages.

(56) References Cited

OTHER PUBLICATIONS

Non-Final Office Action for U.S. Appl. No. 14/611,162, dated Dec. 7, 2016.
Final Office Action for U.S. Appl. No. 14/611,162, dated Jul. 24, 2017.
PCT International Search Report and Written Opinion for International Application No. PCT/US15/13998, Applicant Magic Leap, Inc., dated May 1, 2015, 9 pages.
Non-Final Office Action for U.S. Appl. No. 14/726,429, dated Sep. 2, 2016.
Final Office Action for U.S. Appl. No. 14/726,429, dated May 17, 2017.
PCT International Search Report and Written Opinion for International Application No. PCT/US15/33416, Applicant Magic Leap, Inc., dated Oct. 26, 2015, 12 pages.
Hua, et al. "An Optical See-through Multi-Focal-Plane Stereoscopic Display Prototype Enabling Nearly-Correct Focus Cues," Stereoscopic Displays and Applications XXIV, Proc. of SPIE-IS&T Electronic Imaging, SPIE vol. 8648, 86481A, Mar. 12, 2013. doi: 10.1117/12.2005117.
Hu, Xinda. "Development of the Depth-Fused Multi-Focal-Plane Display Technology," The University of Arizona, 2014.
Cheng, et al. "Design of a wide-angle, lightweight head-mounted display using free-form optics tiling," Optics Letters, vol. 36, No. 11, Jun. 1, 2011, 2098-2100.
Cheng, et al. "Light field head-mounted display with correct focus cue using micro structure array," Chinese Optics Letters, 12(6), Jun. 10, 2014, 060010.
Hu, et al. "High-resolution optical see-through multi-focal-plane head-mounted display using freeform optics," Optics Express, 22 (11), Jun. 2, 2014, 13896-13903. OI: 10.1364/0E.22.013896.
Hu, et al. "A depth-fused multi-focal-plane display prototype enabling focus cues in stereoscopic displays," SID 11 Digest, 2011, 691-694.
Hu, et al. "Design of an optical see-through multi-focal-plane stereoscopic 3D display using freeform prisms," FiO/LS Technical Digest, 2012.
Hu, et al. "Design and assessment of a depth fused multi-focal-plane display prototype," Journal of display technology, 10 (4), Apr. 2014, 308-316.
PCT International Search Report and Written Opinion for International Application No. PCT/US15/33412, Applicant Magic Leap, Inc., dated Oct. 26, 2015, 13 pages.
Non-Final Office Action for U.S. Appl. No. 14/726,396, dated Mar. 15, 2017.
Final Office Action for U.S. Appl. No. 14/726,396, dated Aug. 16, 2017.
Response to Final Office Action for U.S. Appl. No. 14/726,429, filed Aug. 17, 2017.
Response to Non-Final Office Action filed Jun. 28, 2017 for U.S. Appl. No. 14/611,1547.
Response to Non-Final Office Action for U.S. Appl. No. 14/611,162, filed Apr. 7, 2017.
Response to Non-Final Office Action for U.S. Appl. No. 14/726,396, filed Jun. 15, 2017.
Extended European Search Report for European PatentApplication No. 15743704.7 dated Sep. 8, 2017.
Schowengerdt, B., et al., "3D Displays Using Scanning Laser Projection," Department of Mechanical Engineering, University of Washington, ISSN 0097-966XX/12/4302, dated 2012 (4 pages).
Notice of Allowance for U.S. Appl. No. 14/726,429 dated Sep. 13, 2017.
Extended European Search Report for European Patent Application No. 15743225.3 dated Sep. 19, 2017.
Response to Final Office Action filed Oct. 26, 2017 for U.S. Appl. No. 14/611,154.
Amendment after Final Office Action filed Sep. 22, 2017 for U.S. Appl. No. 14/611,162.
Advisory Action dated Oct. 26, 2017 for U.S. Appl. No. 14/611,162.
Response to Non Final Office Action filed Feb. 28, 2017 for U.S. Appl. No. 14/726,429.
Response to Final Office Action filed Nov. 16, 2017 for U.S. Appl. No. 14/726,396.
Amendment and Response accompanying RCE filed Nov. 22, 2017 for U.S. Appl. No. 14/611,162.
Amended Claims filed in European Patent Application No. 15799569.7 dated Dec. 30, 2016.
Non-Final Office Action filed Dec. 21, 2017 for U.S. Appl. No. 14/726,396.
Non-Final Office Action dated Dec. 26, 2017 for U.S. Appl. No. 14/611,154.
Extended European Search Report for European Patent Application No. 15799569.7 dated Jan. 18, 2018.
Extended European Search Report for European Patent Application No. 15799774.3 dated Jan. 2, 2018.
Shiro Suyama et al., "Three-Dimensional Display System with Dual-Frequency Liquid-Crystal Varifocal Lens", Jpn J. Appl. Phys., vol. 39 (2000) pp. 480-484, Part1, No. 2A, Feb. 2000, 6 pp.
Response to Non-Final Office Action filed Mar. 21, 2018 for U.S. Appl. No. 14/726,396.
Response to Office Action filed Mar. 23, 2018 for U.S. Appl. No. 14/611,154.
Response to Extended EP Search report filed Mar. 29, 2018 for European Patent Application No. 15743704.7.
Office action dated Feb. 2, 2018 for Chinese application No. 201580041059.8, office action is in Chinese language with a translation provided by the foreign associate.
Response to Extended European Search report filed Apr. 12, 2018 for European Patent application No. 15743225.3.
Non-Final Office Action for U.S. Appl. No. 15/819,887, dated Apr. 19, 2018.
Final Office Action dated Apr. 30, 2018 for U.S. Appl. No. 14/611,154.
Response to Final office action filed Jul. 30, 2018 for U.S. Appl. No. 14/611,154.
Office action dated Apr. 3, 2018 for Chinese application No. 201580017627.0, in Chinese language with English translation provided by the foreign associate.
Amendment after Non-Final Office Action filed Jul. 19, 2018 for U.S. Appl. No. 15/819,887.
Notice of Allowance for U.S. Appl. No. 14/726,396 dated Jul. 2, 2018.
Response to Extended European Search Report filed Jul. 30, 18 for European Patent application No. 15799774.3.
Response to Extended European Search Report submitted Aug. 14, 2018 for European Patentapplication No. 15799569.7, 11 pages.
Office Action dated Jul. 20, 2018 for Chinese Application No. 201580017626.6, including translation provided by Chinese associate.
Notice of Allowance dated Sep. 10, 2018 for U.S. Appl. No. 15/819,887.
Office Action dated Sep. 25, 2018 for Japanese Application No. 2016-549247 with English Translation from foreign associate.
Office Action dated Oct. 6, 2018 for Australian Application No. 2015210704.
Notice of Allowance for U.S. Appl. No. 14/726,396 dated Sep. 28, 2018.
Office Action dated Sep. 21, 2018 for Japanese Application No. 2016-549347, including translation provided by Japanese associate.
Office Action dated Sep. 7, 2018 for Australian Application No. 2015266670.
Office Action dated Oct. 8, 2018 for Chinese Patent Application No. 20150041033.3, in Chinese language only.
Office Action response filed Dec. 3, 2018 for Chinese Application No. 201580017626.6, in Chinese language with claims in English.
Response to Office Action filed Jun. 13, 2018 for Chinese application No. 201580041059.8, in Chinese language with claims in English.
Office action dated Oct. 15, 2018 for Chinese application No. 201580041059.8, in Chinese language with a translation provided by the foreign associate.
Response to Office Action filed Nov. 29, 2018 for Japanese Application No. 2016-549347, with claims in English provided by foreign associate.

(56) References Cited

OTHER PUBLICATIONS

Non Final Office Action dated Dec. 4, 2018 for U.S. Appl. No. 14/611,154.
Response to Office action filed Aug. 13, 2018 for Chinese application No. 201580017627.0, in Chinese language with claims in English.
Non final office action dated Jun. 27, 2018 for U.S. Appl. No. 14/611,162.
Response to Non final office action filed Sep. 26, 2018 for U.S. Appl. No. 14/611,162.
Response to Office action filed Dec. 18, 2018 for Japan application No. 2016-54927, in Japanese language with claims in English.
Response to 2nd Office Action filed Dec. 25, 2018 for Chinese application No. 201580041059.8, in Chinese language.
Notice of Allowance dated Jan. 24, 2019 for U.S. Appl. No. 14/611,162.
Office Action dated Jan. 11, 2019 for Chinese Application No. 201580017627.0, including translation provided by Chinese associate.
Office action dated Jan. 15, 2019 for Israeli application No. 249091, in Israeli language with translation provided by foreign associate.
Response to Office action filed Mar. 4, 2019 for U.S. Appl. No. 14/611,154.
Notice of Allowance dated Mar. 5, 2019 for Japanese Patent application No. 2016-549347.
Response to 2nd Office Action filed Mar. 20, 2019 for Chinese application No. 201580017627.0, in Chinese language only.
Response to Examination Report filed Mar. 22, 2019 for Australian application No. 2015266670.
Notice of Allowance dated Apr. 1, 2019 for Japanese Patent Application No. 2016-549247.
Office Action dated Mar. 15, 2019 for Japanese Application No. 2016-570027 with English Translation from foreign associate.
Notice of Allowance dated Apr. 9, 2019 for U.S. Appl. No. 14/611,154.
Office Action dated Apr. 1, 2019 for Japanese Application No. 2016-570034 with English Translation from foreign associate.
Office Action dated Mar. 1, 2019 for Chinese Patent Application No. 201580041033.3, including translation provided by Chinese associate.
Response to Examination Report filed May 2, 2019 for Australian application No. 2015210704.
Notice of Acceptance dated Apr. 26, 2019 for Australian Application No. 2015266670.
Response to OA Filed May 13, 2019 for Israeli application No. 249091, in Israeli language with translation provided by foreign associate.
Notice of Allowance dated May 6, 2019 for Chinese Patent Application No. 201580017626.6; No English Translation.
First Examination Report dated May 3, 2019 for Australian Patent Application No. 2015210708.
Office Action dated May 30, 2019 for U.S. Appl. No. 16/261,455.
Response to 1st Office Action filed Jun. 11, 2019 for Japanese application No. 2016-570027, in Japanese language only.
Response to 1st Office Action filed Jun. 11, 2019 for Japanese application No. 2016-570034, in Japanese language only.
Office action dated Jun. 4, 2019 for Chinese application No. 201580041059.8, in Chinese language with a translation provided by the foreign associate.
Office Action dated Jun. 14, 2019 for Chinese Patent Application No. 201580017627.0, including translation provided by Chinese associate.
Response to OA filed Jul. 10, 2019 for Chinese Patent Application No. 201580041033.3, no English translation provided by Chinese associate, only amend claims in English.
Penultimate Office Action dated Aug. 6, 2019 for Japanese Application No. 2016-570027 with English Translation from foreign associate, 5 pages.
Response to OA filed Aug. 14, 2019 for Chinese Patent Application No. 201580041059.8, no English translation provided by Chinese associate, only amend claims in English, 80 pages.
Response to OA filed Aug. 23, 2019 for Chinese Patent Application No. 201580017627.0, no English translation provided by Chinese associate, 5 pgs.
Penultimate Office Action dated Aug. 1, 2019 for Japanese Application No. 2016-570034 with English Translation from foreign associate, 4 pages.
Amendment Response to OA filed for U.S. Appl. No. 16/261,455 dated Aug. 29, 2019.
Examination Report for European Application No. 15743704.7 dated Aug. 1, 2019, 6 pages.
Examination Report for New Zealand Application No. 727361 dated Sep. 13, 2019, 3 pages.
Examination Report for Australian Application No. 2015266585 dated Sep. 18, 2019, 4 pages.
Response to Penultimate Office Action filed Oct. 29, 2019, for Japanese Application No. 2016-570034 no English Translation, 3 pages.
Examination Report for New Zealand Application No. 727365 dated Oct. 31, 2019, 5 pages.
Notice of Allowance dated Nov. 19, 2019 for U.S. Appl. No. 16/261,455.
Office Action dated Nov. 12, 2019 for Chinese Patent Application No. 201580041033.3, including English translation provided by Chinese associate (7 pages).
Response to Examination Report for European Application No. 15743704.7 filed Dec. 10, 2019, 10 pages.
Response to Examination Report for Australian Application No. 2015210708 filed Dec. 11, 2019, 18 pages.
Office action dated Dec. 12, 2019 for Chinese application No. 201580041059.8, in Chinese language with a translation provided by the foreign associate, 8 pages.
Office Action dated Dec. 12, 2019 for Chinese Patent Application No. 201580017627.0, including English translation provided by Chinese associate, 5 pages.
Response to Office Action filed Jan. 10, 2020 for Chinese Patent Application No. 201580041033.3, no English Translation, (4 pages).
Notice of Acceptance dated Dec. 16, 2019 for Australian Application No. 2015210708.
Notice of Allowance for Japanese Appln. No. 2016-570034 dated Jan. 8, 2020.
Examination Report for New Zealand Application No. 722904 dated Feb. 7, 2020, 2 pages.
Response to Office Action filed Feb. 19, 2020 for Chinese Patent Application No. 201580017627.0, no English Translation, (9 pages).
Response to Office Action filed Feb. 26, 2020 for Chinese Patent Application No. 201580041059.8, no English Translation.
Office Action dated Jan. 29, 2020 for Japanese Patent Application No. 2019-65723, including English translation, (10 pages).
Cited Ref2 for Japanese Patent Application No. 2019-65723, no English translation, (11 pages).
Notice of Allowance dated Mar. 4, 2020 for U.S. Appl. No. 16/261,455.
Office Action dated Feb. 6, 2020 for Korean Patent Application No. 10-2016-7023727, (2 pages).
1st Examination Report for EP Patent Appln. No. 15799774.3 dated Feb. 20, 2020.
Foreign Office Action for Japanese Patent Appln. No. 2016-570027 dated Feb. 10, 2020.
Examiner's Report for New Zealand Appln. No. 722903 dated Feb. 7, 2020.
Response to Examination Report for Australian Application No. 2015266585 filed Apr. 8, 2020, 18 pages.
Response to First Examination Report for New Zealand Application No. 727365 dated Apr. 21, 2020.
Response to First Examination Report for New Zealand Application No. 727361 dated Mar. 9, 2020.
Foreign Office Action for Indian Patent Appln. No. 201647026958 dated Apr. 23, 2020.
Office Action Response filed Apr. 30, 2020 for Japanese Application No. 2016-570027, in Japanese language with claims in English [ML-0229JP].
Foreign Notice of Allowance for CA Patent Appln. No. 2938264 dated Apr. 9, 2020.

(56) References Cited

OTHER PUBLICATIONS

Foreign Office Action for New Zealand Patent Appln. No. 722904 dated May 8, 2020.
Foreign Notice of Allowance for JP Patent Appln. No. 2016-570027 dated May 8, 2020.
First Examination Report dated May 12, 2019 for New Zealand Patent Application No. 722903.
Notice of Acceptance for AU Patent Appln. No. 2015266585 dated May 11, 2020.
Foreign Office Action for KR Patent Appln. No. 10-2016-7023729, dated May 25, 2020.
Foreign Office Action for CN Patent Appln. No. 201580041033.3, dated May 11, 2020.
Foreign Office Action for KR Patent Appln. No. 10-2016-7036877, dated Jun. 19, 2020.
Extended European Search Report for EP Patent Appln. No. 20173220.3 dated Jun. 18, 2020.
Foreign Office Action Response for Korean Patent Application No. 10-2016-7036877 dated Jun. 19, 2020.
Foreign Office Action for CN Patent Appln. No. 201580041033.3, dated Jul. 15, 2020.
Foreign Examiner's Report for CA Patent Appln. No. 2950429 dated Jul. 9, 2020.
Foreign Office Action Response for European Patent Appln. No. 15799774.3 dated Jul. 1, 2020.
Foreign Response for KR Patent Appln. No. 10-2016-7023729 dated Jul. 27, 2020.
Foreign OA Amendment for KR Patent Appln. No. 10-2016-7036877 dated Aug. 14, 2020.
1st Examination Report for AU Patent Appln. No. 2016262579 dated Jul. 17, 2020.
1st Examination Report for AU Patent Appln. No. 2019219728 dated Aug. 19, 2020.
Foreign Office Action for IL Patent Appln. No. 249089 dated Jul. 7, 2020.
Foreign Notice of Allowance for CA Patent Appln. No. 2938262 dated Aug. 5, 2020.
Foreign Office Action for KR Patent Appln. No. 10-2016-7023729 dated Sep. 14, 2020.
Foreign OA Response for JP Patent Appln. No. 2019-87069 dated Sep. 15, 2020.
Foreign OA Response for KR Patent Appln. No. 10-2016-7036875 dated Sep. 18, 2020.
Foreign Office Action for JP Patent Application No. 2019-108514 dated Sep. 2, 2020.
Foreign Response for NZ Patent Appln. No. 727365 dated Aug. 11, 2020.
Foreign 3rd Patent Exam Report for NZ Patent Appln. No. 727365 dated Sep. 30, 2020.
Non Final Office Action dated Jul. 7, 2020 U.S. Appl. No. 16/373,227 51 pages.
Amendment filed Oct. 7, 2020, U.S. Appl. No. 16/373,227 10pages.
Foreign OA Response for KR Patent Appln. No. 10-2016-7023729 dated Oct. 14, 2020.
Foreign Office Action for JP Patent Appln. No. 2019-65723 dated Sep. 28, 2020.
Foreign Notice of Allowance for KR Patent Appln. No. 10-2016-7036875 dated Oct. 14, 2020.
Foreign OA Response for KR Patent Appln. No. 10-2016-7036877 dated Oct. 16, 2020.
Foreign OA Response for CA Patent Appln. No. 2950429 dated Oct. 26, 2020.
Foreign Notice of Allowance for KR Patent Appln. No. 10-2016-7023729 dated Oct. 21, 2020.
Non-Final Office Action for U.S. Appl. No. 16/460,315 dated Jul. 28, 2020.
1st Patent Exam Report for NZ Patent Appln. No. 762432 dated Sep. 4, 2020.
Amendment Response to NFOA for U.S. Appl. No. 16/460,315 dated Oct. 28, 2020.
Foreign Amendment Response for NZ Patent Appln. No. 727365 dated Oct. 29, 2020.
Foreign OA Response for IN Patent Appln. No. 201647026958 dated Oct. 22, 2020.
Foreign OA for JP Patent Appln. No. 2019-195867 dated Oct. 23, 2020.
Foreign OA Response for KR Patent Appln. No. 10-2016-7036877 dated Nov. 13, 2020.
Final Office Action for U.S. Appl. No. 16/460,315 dated Nov. 19, 2020.
First Exam Report for AU Patent Appln. No. 2019213313 dated Sep. 8, 2020.
Foreign OA Response for JP Patent Application No. 2019-108514 dated Nov. 25, 2020.
Foreign Final OA for JP Patent Application No. 2019-87069 dated Nov. 4, 2020.
Non-Final Office Action for U.S. Appl. No. 16/123,711 dated Nov. 25, 2020.
Foreign Notice of Allowance for KR Patent Appln. No. 10-2016-7036877 dated Dec. 3, 2020.
Foreign OA Response for JP Patent Application No. 2019-65723 dated Dec. 16, 2020.
Foreign OA Response for JP Patent Appln. No. 2019-195867 dated Dec. 23, 2020.
Foreign Response for AU Patent Application No. 2019280001 dated Dec. 23, 2020.
Foreign Notice of Allowance for JP Patent Appln. No. 2019-108514 dated Dec. 28, 2020.
Foreign Notice of Allowance for CA Patent Appln. No. 2950429 dated Dec. 15, 2020.
Foreign Notice of Allowance for CN Patent Appln. No. 201580041033.3 dated Dec. 16, 2020.
Foreign Response for IL Patent Appln. No. 249089 dated Jan. 3, 2021.
RCE Amendment and response Final Office Action for U.S. Appl. No. 16/460,315, filed Feb. 19, 2021.
Amendment Response for U.S. Appl. No. 16/123,711 dated Feb. 25, 2021.
Foreign Notice of Appeal for JP Patent Appln. No. 2019-087069 dated Mar. 3, 2021.
Foreign Response for JP Patent Appln. No. 2019-087069 dated Mar. 3, 2021.
Foreign Exam Report for CA Patent Appln. No. 2950425 dated Feb. 9, 2021.
Foreign Response for EP Patent Appln. No. 20173220.3 dated Mar. 19, 2021.
Foreign OA for JP Patent Appln. No. 2019-195867 dated Mar. 23, 2021.
Foreign Response for NZ Patent Appln. No. 762432 dated Apr. 1, 2021.
Non-Final Office Action for U.S. Appl. No. 16/460,315 dated Apr. 5, 2021.
Gordon D. Love, David M. Hoffman, Philip JW. Hands, James Gao, Andrew K. Kirby and Martin S. Banks, "High-speed switchable lens enables the development of a volumetric stereoscopic display", Optics Express, vol. 17, No. 18, p. 15716-15725,2009 (Year: 2009).
Foreign NOA for JP Patent Appln. No. 2019-87069 dated Apr. 8, 2021.
Foreign Resonse for AU Patent Appln. No. 2019213313 dated Apr. 12, 2021.
Foreign OA for CN Patent Appln. No. 201910654692.4 dated Feb. 24, 2021.
Foreign NOA for IL Patent Appln. No. 246995 dated Feb. 17, 2021.
Foreign NOA for IL Patent Appln. No. 246996 dated Feb. 17, 2021.
Final Office Action for U.S. Appl. No. 16/123,711 dated Apr. 23, 2021.
Foreign Response for CA Patent Appln. No. 2950425 dated May 14, 2021.
Foreign First Exam Report for EP Patent Appln. No. 15743225.3 dated Apr. 29, 2021.
Foreign NOA for JP Patent Appln. No. 2019-65723 dated May 25, 2021.
Foreign NOA for IL Patent Appln. No. 249089 dated Mar. 14, 2021.

(56) References Cited

OTHER PUBLICATIONS

Foreign Respinse for JP Patent Appln. No. 2019-195867 dated Jun. 11, 2021.
Foreign Exam Report for NZ Patent Appln. No. 764960 dated May 26, 2021.
Foreign Exam Report for NZ Patent Appln. No. 764952 dated May 26, 2021.
Foreign Response for AU Patent Appln. No. 2019219728 dated Jun. 28, 2021.
Foreign Response for IL Patent Appln. No. 274429 dated Jun. 29, 2021.
Foreign Exam Report for EP Patent Appln. No. 20173220.3 dated Jun. 16, 2021.
Amendment Response to NFOA for U.S. Appl. No. 16/460,315 dated Jul. 6, 2021.
1st Exam Report for NZ Patent Appln. No. 764950 dated Jun. 3, 2021.
Foreign Response for CN Patent Appln. No. 201910654692.4 dated Jul. 12, 2021.
Response to Final Office Action and RCE for U.S. Appl. No. 16/123,711, filed Jul. 22, 2021.
Foreign Notice of Acceptance for AU Patent Appln. No. 2019219728 dated Jul. 20, 2021.
Notice of Allowance for U.S. Appl. No. 16/640,315 dated Aug. 20, 2021.
Foreign NOA for CA Patent Appln. No. 2950425 dated Aug. 20, 2021.
Foreign Response for EP Patent Appln. No. 15743225.3 dated Sep. 2, 2021.
Non-Final Office Action for U.S. Appl. No. 16/123,711 dated Sep. 14, 2021.
Foreign Exam Report for EP Patent Appln. No. 15799569.7 dated Sep. 10, 2021.
Foreign OA for CN Patent Appln. No. 202010405568.7 dated Aug. 25, 2021 (with English translation).
Foreign Response for EP Patent Appln. No. 20173220.3 dated Oct. 22, 2021.
Foreign OA for CN Patent Appln. No. 202110217829.7 dated Sep. 22, 2021.
Foreign Response for NZ Patent Appln. No. 764952 dated Nov. 19, 2021.
Foreign Response for NZ Patent Appln. No. 764960 dated Nov. 19, 2021.
Foreign Response for NZ Patent Appln. No. 764950 dated Nov. 26, 2021.
Foreign Exam Report for NZ Patent Appln. No. 764952 dated Nov. 24, 2021.
Foreign OA for CN Patent Appln. No. 202010626648.5 dated Nov. 1, 2021.
Amendment Response to NFOA for U.S. Appl. No. 16/123,711 dated Dec. 7, 2021.
2nd Exam Report for NZ Patent Appln. No. 764960 dated Nov. 30, 2021.
Foreign OA for JP Patent Appln. No. 2021-007792 dated Dec. 2, 2021.
Foreign Exam Report for 3089749 dated Dec. 1, 2021.
Foreign NOA for CN Patent Appln. No. 201910654692.4 dated Dec. 15, 2021.
Foreign NOA for IL Patent Appln. No. 246995 dated Nov. 22, 2021.
Foreign NOA for IL Patent Appln. No. 283164 dated Nov. 22, 2021.
Foreign Response for CN Patent Appln. No. 202010405568.7 dated Jan. 5, 2022.
Foreign Response for EP Patent Appln. No. 15799569.7 dated Jan. 18, 2022.
Foreign Response for CN Patent Appln. No. 202110217829.7 dated Jan. 25, 2022.
Final Office Action for U.S. Appl. No. 16/123,711 dated Feb. 8, 2022.
Foreign NOA for CN Patent Appln. No. 202010405568.7 dated Jan. 26, 2022.
Foreign Response for JP Patent Appln. No. 2021-7792 dated Feb. 17, 2022.
Foreign Response for CN Patent Appln. No. 202010626648.5 dated Mar. 9, 2022.
Amendment After Final for U.S. Appl. No. 16/794,513 dated Mar. 10, 2022.
Foreign Communication for EP Patent Appln. No. 15743225.3 dated Mar. 17, 2022.
Foreign Response for CA Patent Appln. No. 3089749 dated Mar. 25, 2022.
Foreign NOA for IL patent Appln. No. 274429 dated Feb. 16, 2022.
Non-Final Office Action for U.S. Appl. No. 17/327,924 dated Apr. 8, 2022.
Amendment Response to FOA for U.S. Appln. No. 16/123.711 dated May 6, 2022.
Foreign NOA for CN Patent Appln. No. 202110217829.7 dated Mar. 28, 2022.
Foreign NOA for CN Patent Appln. No. 202010626648.5 dated Apr. 15, 2022.
Foreign OA for JP Patent Appln. No. 2021-102212 dated Mar. 31, 2022.
Foreign OA for JP Patent Appln. No. 2021-33242 dated May 25, 2022.
Foreign Response for JP Patent Appln. No. 2021-102212 dated Jun. 30, 2022.
Foreign OA for JP Patent Appln. No. 2021-7792 dated Jun. 6, 2022 with English translation.
Foreign Decision to Grant for EP Patent Appln. No. 20173220.3 dated Jun. 17, 2022.
Foreign Notice of Acceptance for NZ Patent Appln. No. 764950 dated Jun. 3, 2022.
Notice of Allowance for U.S. Appl. No. 16/123,711 dated May 27, 2022.
Amendment Response to NFOA for U.S. Appl. No. 17/327,924 dated Jul. 8, 2022.

\* cited by examiner

METHODS AND SYSTEM FOR CREATING FOCAL PLANES IN VIRTUAL AND AUGMENTED REALITY

CROSS-REFERENCE TO RELATED APPLICATION(S)

This application is a continuation of pending U.S. patent application Ser. No. 16/261,455 filed Jan. 29, 2019, entitled "METHODS AND SYSTEM FOR CREATING FOCAL PLANES IN VIRTUAL AND AUGMENTED REALITY", which is a continuation of U.S. Ser. No. 15/819,887 filed Nov. 21, 2017, entitled "METHODS AND SYSTEM FOR CREATING FOCAL PLANES IN VIRTUAL AND AUGMENTED REALITY", which is a continuation of U.S. patent application Ser. No. 14/726,429, entitled "METHODS AND SYSTEM FOR CREATING FOCAL PLANES IN VIRTUAL AND AUGMENTED REALITY," filed May 29, 2015, which claims priority from U.S. Provisional Patent Application Ser. No. 62/005,834, entitled "METHODS AND SYSTEMS FOR CREATING FOCAL PLANES IN VIRTUAL AND AUGMENTED REALITY," filed on May 30, 2014. This application is cross-related to U.S. Patent Application Ser. No. 62/005,807, filed on May 30, 2014, and entitled "METHODS AND SYSTEMS FOR VIRTUAL AND AUGMENTED REALITY," U.S. Provisional Patent Application Ser. No. 62/005,865, entitled "METHODS AND SYSTEMS FOR DISPLAYING STEREOSCOPY WITH A FREEFORM OPTICAL SYSTEM WITH ADDRESSABLE FOCUS FOR VIRTUAL AND AUGMENTED REALITY," also filed on May 30, 2014, the content of the aforementioned U.S. applications is hereby expressly incorporated by references for all purposes. This application is also cross-related to U.S. patent application Ser. No. 14/555,585, filed on Nov. 27, 2014, entitled "VIRTUAL AND AUGMENTED REALITY SYSTEMS AND METHODS", U.S. patent application Ser. No. 14/611,154, filed on Jan. 30, 2015, entitled "MULTI-FOCAL DISPLAY SYSTEM AND METHOD", and U.S. patent application Ser. No. 14/611,162, filed on Jan. 30, 2015, entitled "MULTI-FOCAL DISPLAY SYSTEM AND METHOD". The contents of the aforementioned patent applications are hereby expressly incorporated by reference in their entirety.

BACKGROUND

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. For example, referring to FIG. 1, an augmented reality scene (4) is depicted wherein a user of an AR technology sees a real-world park-like setting (6) featuring people, trees, buildings in the background, and a concrete platform (1120).

In addition to these items, the user of the AR technology also perceives that he "sees" a robot statue (1110) standing upon the real-world platform (1120), and a cartoon-like avatar character (2) flying by which seems to be a personification of a bumble bee, even though these elements (2, 1110) do not exist in the real world. As it turns out, the human visual perception system is very complex, and producing a VR or AR technology that facilitates a comfortable, natural-feeling, rich presentation of virtual image elements amongst other virtual or real-world imagery elements is challenging.

Referring to FIG. 2A, stereoscopic wearable glasses (8) type configurations have been developed which generally feature two displays (10, 12) that are configured to display images with slightly different element presentation such that a three-dimensional perspective is perceived by the human visual system. Such configurations have been found to be uncomfortable for many users due to a mismatch between vergence and accommodation which must be overcome to perceive the images in three dimensions. Indeed, some users are not able to tolerate stereoscopic configurations. FIG. 2B shows another pair of stereoscopic wearable glasses (14) type configuration featuring two forward-oriented cameras (16, 18) configured to capture images for an augmented reality presentation to the user through stereoscopic displays. The position of the cameras (16, 18) and displays generally blocks the natural field of view of the user when the glasses (14) are mounted on the user's head.

Referring to FIG. 2C, an augmented reality configuration (20) is shown which features a visualization module (26) coupled to a glasses frame (24) which also holds conventional glasses lenses (22). The user is able to see an at least partially unobstructed view of the real world with such a system, and has a small display (28) with which digital imagery may be presented in an AR configuration to one eye—for a monocular AR presentation. FIG. 2D features a configuration having a visualization module (32) that may be coupled to a hat or helmet (30). The visualization module may be configured to present monocular augmented digital imagery to a user through a small display (34). FIG. 2E illustrates another similar configuration including a frame (36) couple-able to a user's head in a manner similar to an eyeglasses coupling so that a visualization module (38) may be utilized to capture images and also present monocular augmented digital imagery to a user through a small display (40). Such a configuration is available, for example, from Google, Inc., of Mountain View, Calif. under the trade name GoogleGlass®.

None of these configurations is optimally suited for presenting a rich, binocular, three-dimensional augmented reality experience in a manner that will be comfortable and maximally useful to the user, in part because prior systems fail to address some of the fundamental aspects of the human perception system, including the photoreceptors of the retina and their interoperation with the brain to produce the perception of visualization to the user.

Referring to FIG. 3, a simplified cross-sectional view (58) of a human eye is depicted featuring a cornea (42), iris (44), lens—or "crystalline lens" (46), sclera (48), choroid layer (50), macula (52), retina (54), and optic nerve pathway (56) to the brain. The macula is the center of the retina, which is utilized to see moderate detail. At the center of the macula is a portion of the retina that is referred to as the "fovea", which is utilized for seeing the finest details of a scene, and which contains more photoreceptors (approximately 120 cones per visual degree) than any other portion of the retina.

The human visual system is not a passive sensor type of system; it is configured to actively scan the environment. In a manner somewhat akin to use of a flatbed scanner to capture an image, or use of a finger to read Braille from a paper, the photoreceptors of the eye fire in response to changes in stimulation, rather than constantly responding to a constant state of stimulation. Thus, motion is required to present photoreceptor information to the brain (as is motion of the linear scanner array across a piece of paper in a flatbed scanner, or motion of a finger across a word of Braille imprinted into a paper).

Indeed, experiments with substances such as cobra venom, which has been utilized to paralyze the muscles of the eye, have shown that a human subject will experience blindness if positioned with his eyes open, viewing a static scene with venom-induced paralysis of the eyes. In other words, without changes in stimulation, the photoreceptors do not provide input to the brain and blindness is experienced. It is believed that this is at least one reason that the eyes of normal humans have been observed to move back and forth, or dither, in side-to-side motion in what are called "microsaccades".

As noted above, the fovea of the retina contains the greatest density of photoreceptors. While it is typically perceived that humans have high-resolution visualization capabilities throughout their field of view, they generally actually have only a small high-resolution center that is mechanically swept around almost constantly, along with a persistent memory of the high-resolution information recently captured with the fovea. In a somewhat similar manner, the focal distance control mechanism of the eye (ciliary muscles operatively coupled to the crystalline lens in a manner wherein ciliary relaxation causes taut ciliary connective fibers to flatten out the lens for more distant focal lengths; ciliary contraction causes loose ciliary connective fibers, which allow the lens to assume a more rounded geometry for more close-in focal lengths) dithers back and forth by approximately ¼ to ½ diopter to cyclically induce a small amount of what is called "dioptric blur" on both the close side and far side of the targeted focal length. This is utilized by the accommodation control circuits of the brain as cyclical negative feedback that helps to constantly correct course and keep the retinal image of a fixated object approximately in focus.

The visualization center of the brain also gains valuable perception information from the motion of both eyes and components thereof relative to each other. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to focus upon an object at a different distance will automatically cause a matching change in vergence to the same distance, under a relationship known as the "accommodation-vergence reflex." Likewise, a change in vergence will trigger a matching change in accommodation, under normal conditions. Working against this reflex (as do most conventional stereoscopic AR or VR configurations) is known to produce eye fatigue, headaches, or other forms of discomfort in users.

Movement of the head, which houses the eyes, also has a key impact upon visualization of objects. Humans move their heads to visualize the world around them; they often are in a fairly constant state of repositioning and reorienting the head relative to an object of interest. Further, most people prefer to move their heads when their eye gaze needs to move more than about 20 degrees off center to focus on a particular object (i.e., people do not typically like to look at things "from the corner of the eye"). Humans also typically scan or move their heads in relation to sounds—to improve audio signal capture and utilize the geometry of the ears relative to the head. The human visual system gains powerful depth cues from what is called "head motion parallax", which is related to the relative motion of objects at different distances as a function of head motion and eye vergence distance. In other words, if a person moves his head from side to side and maintains fixation on an object, items farther out from that object will move in the same direction as the head; items in front of that object will move opposite the head motion. These are very salient cues for where things are spatially in the environment relative to the person—perhaps as powerful as stereopsis. Head motion also is utilized to look around objects, of course.

Further, head and eye motion are coordinated with the "vestibulo-ocular reflex", which stabilizes image information relative to the retina during head rotations, thus keeping the object image information approximately centered on the retina. In response to a head rotation, the eyes are reflexively and proportionately rotated in the opposite direction to maintain stable fixation on an object. As a result of this compensatory relationship, many humans can read a book while shaking their head back and forth. Interestingly, if the book is panned back and forth at the same speed with the head approximately stationary, the same generally is not true—the person is not likely to be able to read the moving book. The vestibulo-ocular reflex is one of head and eye motion coordination, generally not developed for hand motion. This paradigm may be important for augmented reality systems, because head motions of the user may be associated relatively directly with eye motions, and the system preferably will be ready to work with this relationship.

Indeed, given these various relationships, when placing digital content (e.g., 3-D content such as a virtual chandelier object presented to augment a real-world view of a room; or 2-D content such as a planar/flat virtual oil painting object presented to augment a real-world view of a room), design choices may be made to control behavior of the objects. For example, a 2-D oil painting object may be head-centric, in which case the object moves around along with the user's head (e.g., as in a GoogleGlass® approach); or the object may be world-centric, in which case it may be presented as though it is part of the real world coordinate system, so that the user may move his head or eyes without moving the position of the object relative to the real world.

Thus when placing virtual content into the augmented reality world presented with an augmented reality system, choices are made as to whether the object should be presented as world centric, body-centric, head-centric or eye centric. In head-centric approaches, the virtual object stays in position in the real world so that the user may move his body, head, eyes around it without changing its position relative to the real world objects surrounding it, such as a real world wall. In body-centric approaches, a virtual element may be fixed relative to the user's torso, so that the user can move his head or eyes without moving the object, but that is slaved to torso movements, In head centric approaches, the displayed object (and/or display itself) may be moved along with head movements, as described above in reference to GoogleGlass®). In eye-centric approaches, as in a "foveated display" configuration, as is described below, content is slewed around as a function of the eye position.

With world-centric configurations, it may be desirable to have inputs such as accurate head pose measurement, accurate representation and/or measurement of real world objects and geometries around the user, low-latency dynamic rendering in the augmented reality display as a function of head pose, and a generally low-latency display.

The U.S. Patent Applications listed above present systems and techniques to work with the visual configuration of a typical human to address various challenges in virtual reality and augmented reality applications. The design of these virtual reality and/or augmented reality systems presents numerous challenges, including the speed of the system in delivering virtual content, quality of virtual content, eye relief of the user, size and portability of the system, and other system and optical challenges.

The systems and techniques described herein are configured to work with the visual configuration of the typical human to address these challenges.

SUMMARY

Embodiments of the present invention are directed to devices, systems and methods for facilitating virtual reality and/or augmented reality interaction for one or more users. In one aspect, a system for displaying virtual content is disclosed.

In one or more embodiments, an augmented reality display system, comprises a spatial light modulator operatively coupled to an image source for projecting light associated with one or more frames of image data, and a variable focus element (VFE) for varying a focus of the projected light such that a first frame of image data is focused at a first depth plane, and a second frame of image data is focused at a second depth plane, and wherein a distance between the first depth plane and the second depth plane is fixed.

Additional and other objects, features, and advantages of the invention are described in the detail description, figures and claims.

BRIEF DESCRIPTION OF THE DRAWINGS

The drawings illustrate the design and utility of various embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Disclosed are methods and systems for generating virtual and/or augmented reality. In order to provide a realistic and enjoyable virtual reality (VR) or augmented reality (AR) experience, virtual content must be presented at varying depths away from the user such that the virtual content is perceived to be realistically placed or originating from a real-world depth (in contrast to traditional 2D displays). This approach closely mimics the real world experience of sight, in that the eyes constantly change focus in order to view different objects at different depths. For example, muscles of the human eye "tighten" in order to focus on a nearby object, and "relax" in order to focus on an object that is farther away.

By placing virtual content in a manner that closely mimics real objects, the user's natural physiological response (e.g., different focus for different objects) remains substantially intact, thereby providing a more realistic and comfortable viewing experience. This is in contrast to traditional VR or AR systems that force the user to view virtual content on a fixed depth plane (e.g., 2D screen like Google Glass® or Oculus®), forcing the user to go back and forth between real objects of the real world and the virtual content, which causes discomfort to the user. The present application discusses various AR system approaches to project 3D virtual content such that it is perceived at varying depths by the user.

Referring to FIGS. 4A-4D, some general componentry options are illustrated. In the portions of the detailed description which follow the discussion of FIGS. 4A-4D, various systems, subsystems, and components are presented for addressing the objectives of providing a high-quality, comfortably-perceived display system for human VR and/or AR.

Figure 4A:
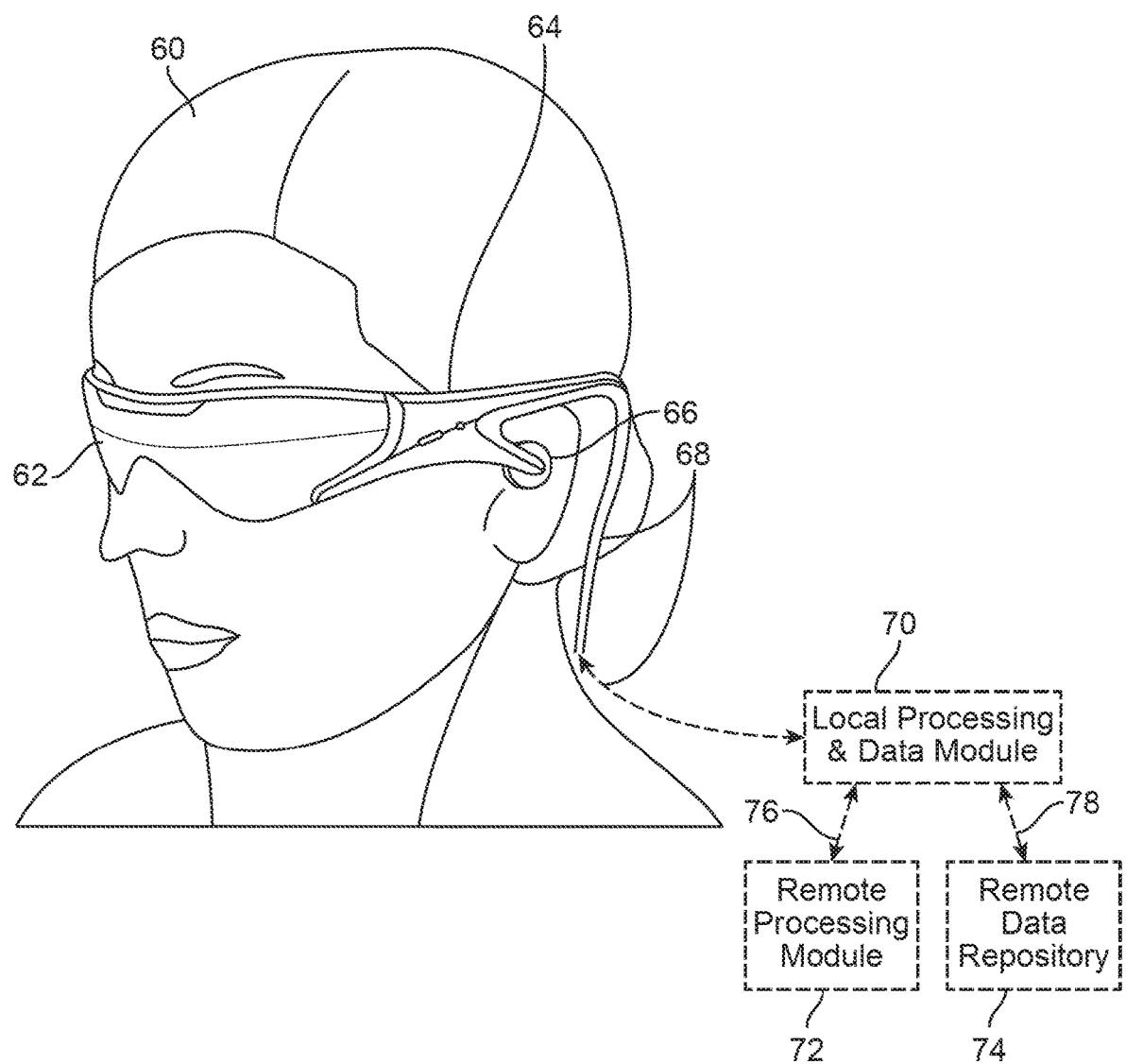
FIGS. 4A-4D illustrate one or more embodiments of various internal processing components of the wearable AR device.
Figure 4B:
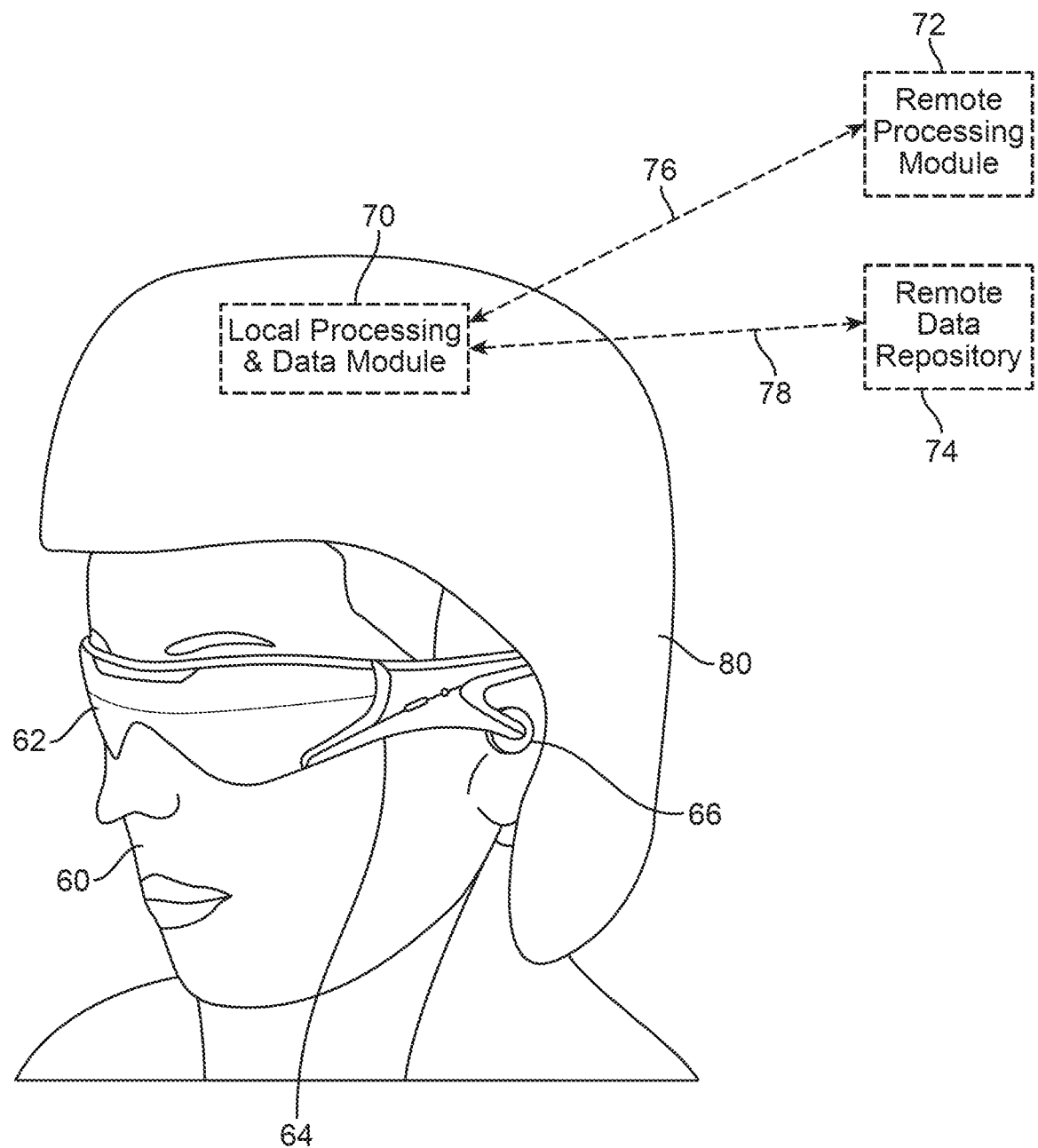
Figure 4C:
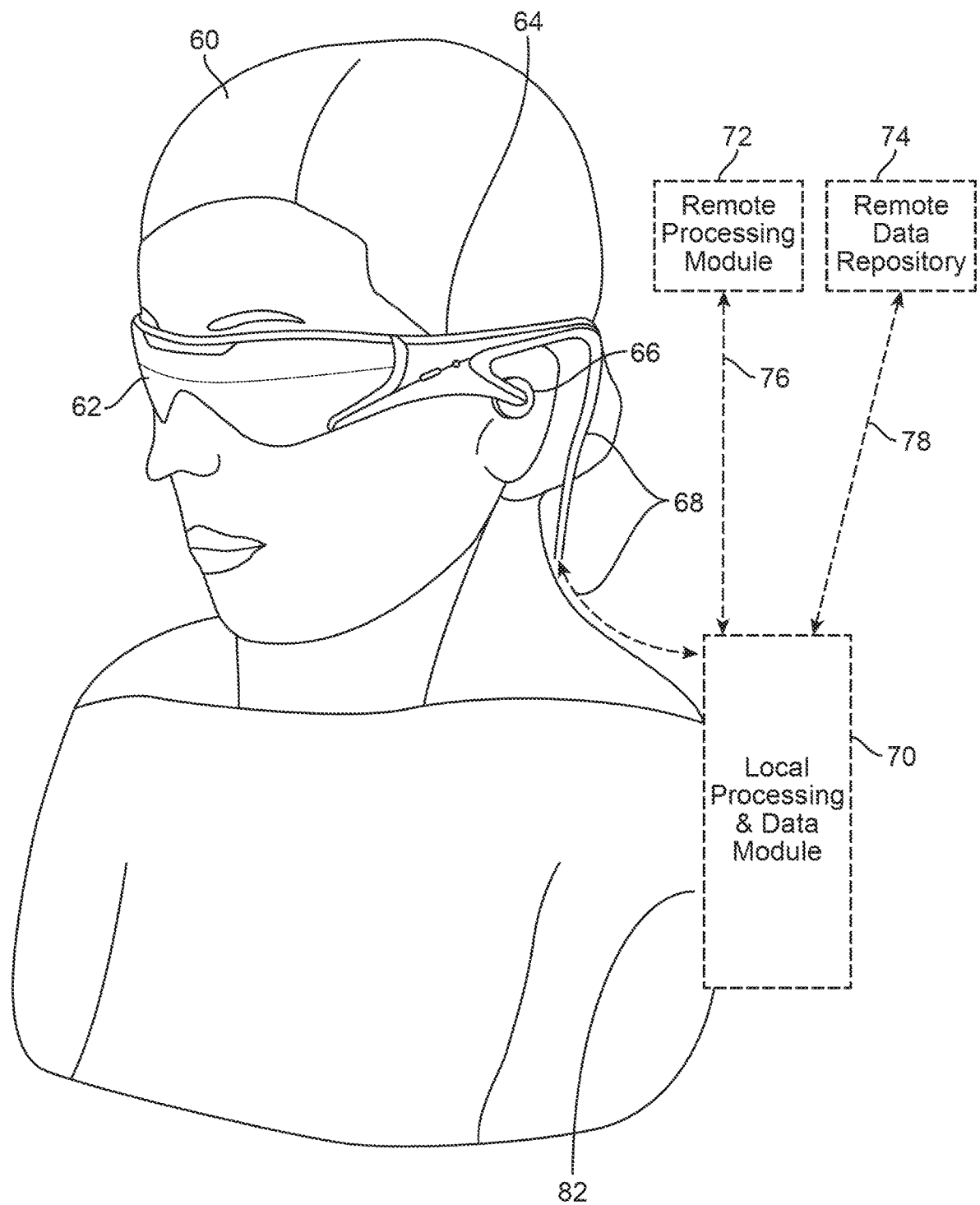
Figure 4D:
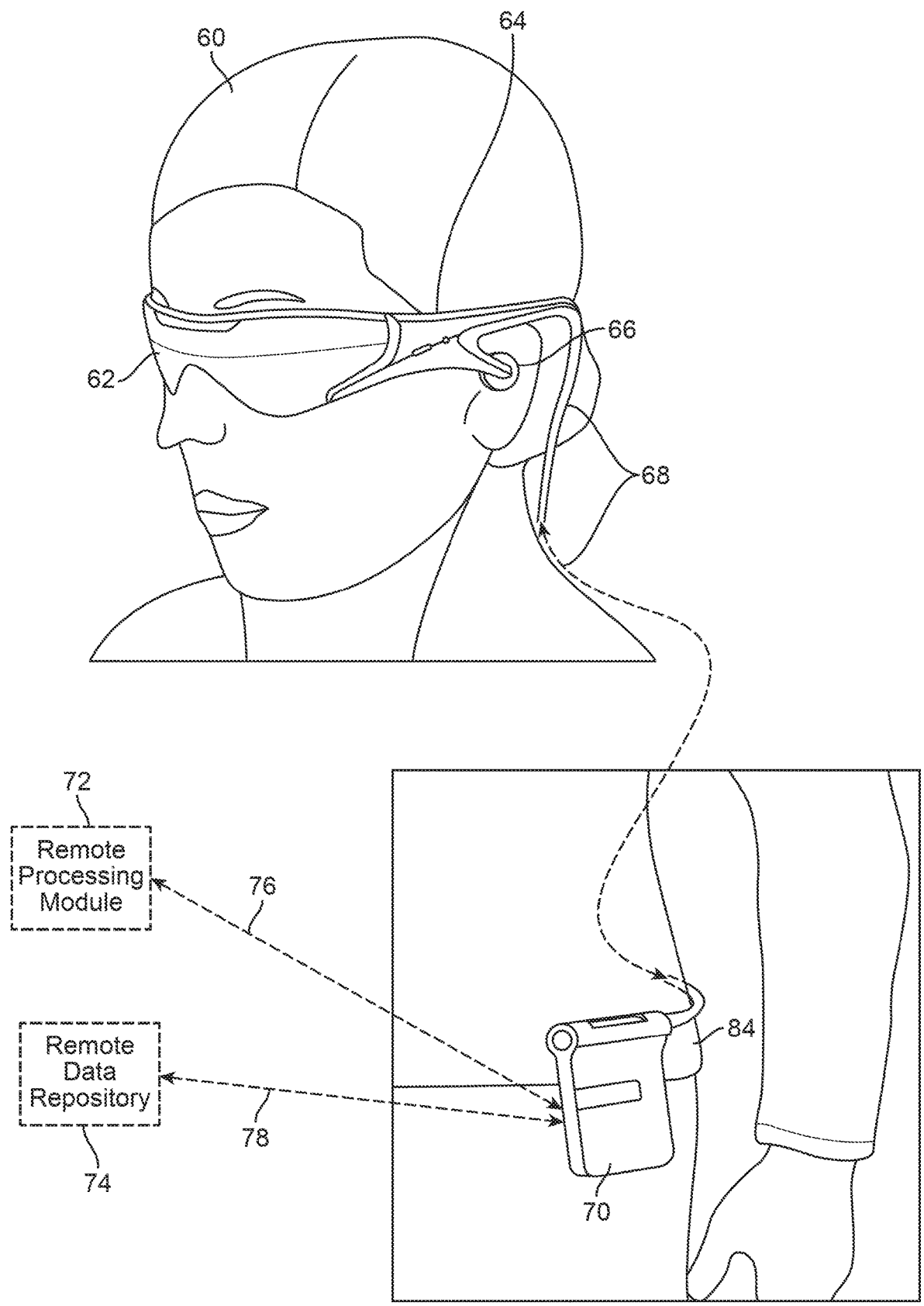

As shown in FIG. 4A, an AR system user (60) is depicted wearing a frame (64) structure coupled to a display system (62) positioned in front of the eyes of the user. A speaker (66) is coupled to the frame (64) in the depicted configuration and positioned adjacent the ear canal of the user (in one embodiment, another speaker, not shown, is positioned adjacent the other ear canal of the user to provide for stereo/shapeable sound control). The display (62) is operatively coupled (68), such as by a wired lead or wireless connectivity, to a local processing and data module (70) which may be mounted in a variety of configurations, such as fixedly attached to the frame (64), fixedly attached to a helmet or hat (80) as shown in the embodiment of FIG. 4B, embedded in headphones, removably attached to the torso (82) of the user (60) in a configuration (e.g., placed in a backpack (not shown)) as shown in the embodiment of FIG. 4C, or removably attached to the hip (84) of the user (60) in a belt-coupling style configuration as shown in the embodiment of FIG. 4D.

The local processing and data module (70) may comprise a power-efficient processor or controller, as well as digital memory, such as flash memory, both of which may be utilized to assist in the processing, caching, and storage of data (a) captured from sensors which may be operatively coupled to the frame (64), such as image capture devices (such as cameras), microphones, inertial measurement units, accelerometers, compasses, GPS units, radio devices, and/or gyros; and/or (b) acquired and/or processed using the remote processing module (72) and/or remote data repository (74), possibly for passage to the display (62) after such processing or retrieval. The local processing and data module (70) may be operatively coupled (76, 78), such as via a wired or wireless communication links, to the remote processing module (72) and remote data repository (74) such that these remote modules (72, 74) are operatively coupled to each other and available as resources to the local processing and data module (70).

In one embodiment, the remote processing module (72) may comprise one or more relatively powerful processors or controllers configured to analyze and process data and/or image information. In one embodiment, the remote data repository (74) may comprise a relatively large-scale digital data storage facility, which may be available through the internet or other networking configuration in a "cloud" resource configuration. In one embodiment, all data is stored and all computation is performed in the local processing and data module, allowing fully autonomous use from any remote modules.

As discussed above, in order to present 3D virtual content to the user, the augmented reality (AR) system projects virtual content at varying depths in the z direction. In other words, the virtual content presented to the user not only changes in the x and y direction (as is the case with most 2D content), but it may also change in the z direction, giving a perception of 3D depth. Thus, the user may perceive a virtual object to be very close (e.g., a virtual book placed on a real desk) or at an infinite distance (e.g., a virtual tree at a very large distance away from the user) or any distance in between. Or, the user may perceive multiple objects simultaneously at different depth planes. For example, the user may see a virtual dragon appear from infinity and running towards the user. In another embodiment, the user may simultaneously see a virtual bird at a distance of 1 meter away from the user and a virtual coffee cup at arm's length from the user.

There may be two main ways of creating a perception of variable depth: multiple-plane focus systems and variable plane focus systems. In a multiple-plane focus system, the system is configured to project virtual content on fixed depth planes in the z direction away from the user. In a variable plane focus system, the system projects one or more depth planes, but moves the depth plane(s) in the z direction to create 3D perception. In one or more embodiments, a variable focus element (VFE) may be utilized to change the focus of light associated with virtual content, such that the light appears to be coming from a particular depth. In other embodiments, hardware components corresponding to different foci may be strategically employed to create a perception of multiple depth planes, as will be discussed in further detail below. The VFE may vary the focus of the light on a frame-by-frame basis.

The following disclosure will go through various embodiments of systems that create 3D perception using multiple plane focus and/or variable plane focus optical elements. It should be appreciated that other approaches may combine aspects of multi-plane focus systems and variable plane focus systems.

Figure 5:
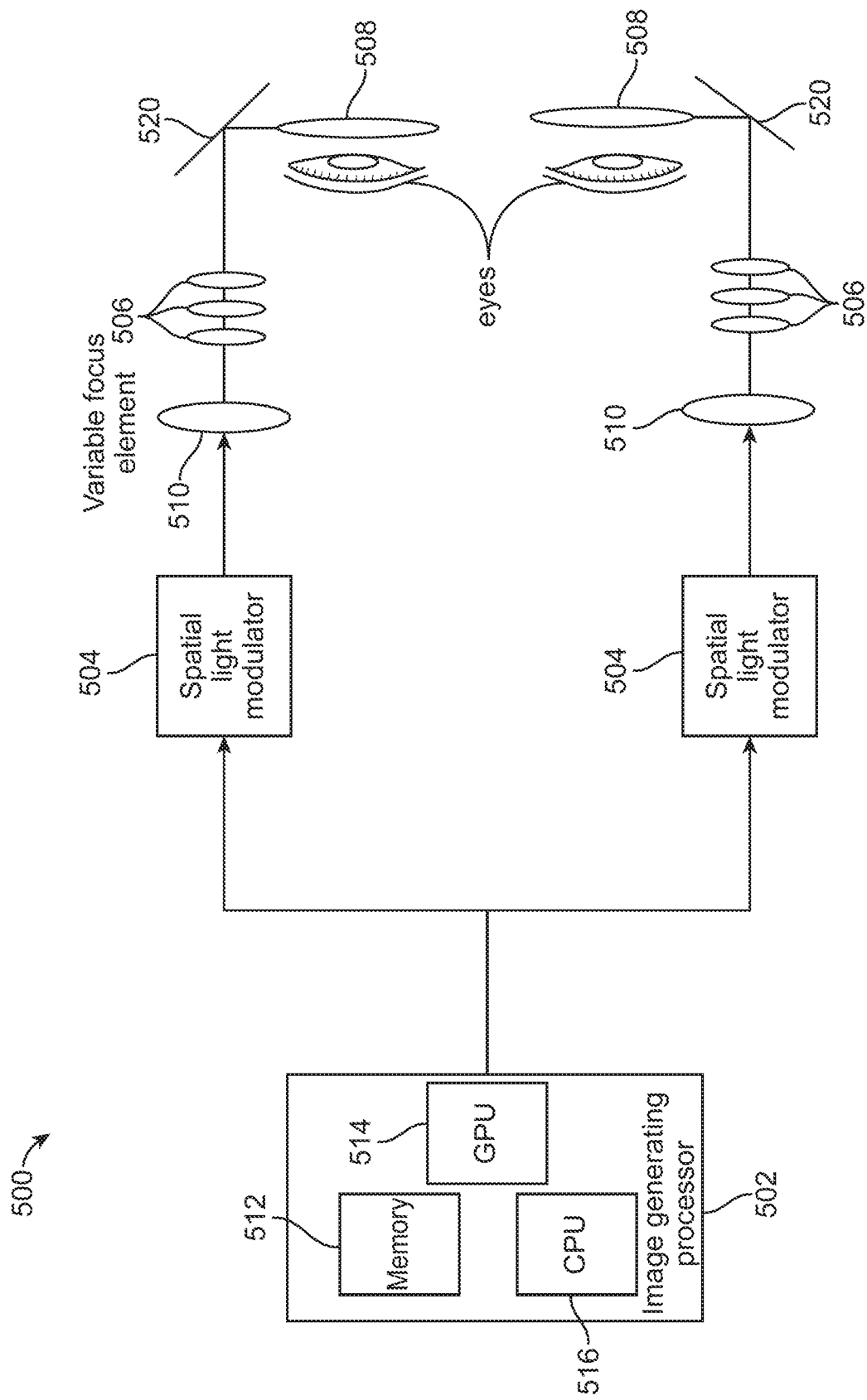
FIG. 5 illustrates a plan view of one embodiment of an augmented reality (AR) system that is configured to be a multi-planar focal system.

Turning first to FIG. 5, an example embodiment of an AR system (500), having multi-plane focus elements is illustrated. As shown in FIG. 5, the AR system (500) comprises a plurality of spatial light modulators (504) (e.g., two spatial light modulators, one for each eye, in the illustrated example), two variable focus elements (VFEs) (510), a plurality of optical elements (506), two beam-splitters (520) two eyepiece optical elements (508), an image-generating process (502), a graphical processing unit ("GPU") (514), a central processing unit ("CPU") (516), and a memory (512). It should be appreciated that other embodiments may comprise greater or fewer components, and the components listed above are for illustrative purposes only, and should not be read as limiting.

In one or more embodiments, the processor (502) is responsible for generating virtual content to be ultimately displayed to the user. The image generating processor (502) may convert an image or video associated with the virtual content to a format that can be projected to the user in 3D. For example, in generating 3D content, the virtual content may need to be formatted such that portions of a particular image are displayed on a particular depth plane while other are displayed at other depth planes. The processor (502) may be configured to slice images to provide 3D slices of a particular image.

For example, say the image to be presented to the user is an image of a house with some trees in the background. The image may be split into at least two depth planes (e.g., a first slice of the image comprising the house, to be projected at a first depth plane, and a second slice of the image comprising the background, to be projected at a second depth plane). In one or more embodiments, the processor (502)

may be programmed to feed slightly different images to right and left eye such that when viewed together, the virtual content appears coherent and comfortable to the user's eyes. Similarly, many other image manipulations may be performed to provide an optimal viewing experience for the user.

In one or more embodiments, the processor (502) may slice the image into 3D slices or frame slices, or, in other embodiments, the images may be pre-sliced and stored at one or more databases associated with the processor (502). It should be appreciated that the term "slice" is used to refer to image planes, or frame slices of a particular virtual scene. In other words, a single virtual scene may comprise a plurality of frame slices or planes. The processor (502) may be configured to execute a set of tasks with the CPU (516). The processor (502) may further comprise a set of standard computing components such as a memory (512), one or more databases (not shown), a graphical processing unit (GPU), a battery (not shown), etc. The GPU (514) is a specialized electronic circuit designed to rapidly manipulate and alter memory to accelerate the creation of images in a frame buffer intended for output to a display. Together, the various components of the processor (502) enable the AR system (500) to perform a variety of computing tasks as needed.

The processor (502) may comprise a set of additional electronic components, such as a microprocessor/microcontroller, battery, telemetry circuitry, monitoring circuitry, and other suitable components known to those skilled in the art. The processor (502) may execute suitable programs stored in the memory (512) for directing and controlling the images, optics, and/or the spatial light modulators (504).

It should be appreciated that in some embodiments, the processor (502) may be housed in the frame of the wearable AR system (e.g., the frame (62) in FIG. 4A). In other embodiments, the image generating processor and other circuitry may be housed in another component (e.g., the belt pack in FIG. 4D) that is coupled to the wearable optics.

As shown in FIG. 5, the processor (502) is operatively coupled to the spatial light modulator (504) which projects the light associated with the desired virtual content. Although the illustrated embodiment shows two spatial light modulators, one for each of the user's eyes, it is contemplated that other embodiments comprise more than two spatial light modulators. In yet another embodiment, a single spatial light modulator may be used for both eyes. As discussed above, in some embodiments, each of the spatial light modulators (504) may be fed a slightly different view of a particular virtual image. In one or more embodiments, the spatial light modulator (504) may be connected to a light source, and may comprise circuitry to modulate the light associated with the images. The spatial light modulator (504) or display may refer to any type of light display device. Examples may include a Digital Light Processing system ("DLP"), Digital Mircomirror Device ("DMD"), a Liquid Crystal Display ("LCD"), an Organic Light-Emitting Diode ("OLED"), a Liquid Crystal on Silicon ("LCOS"), or a fiber scanner display (FSD). It should be appreciated that various embodiments of the AR system may specifically refer to a type of spatial light modulator (e.g., DLP, FSD, etc.) for illustrative purposes, but any type of spatial light modulator may be used in the embodiments below, and the described embodiments should not be read as limiting.

Various aspects of the spatial light modulator (e.g., speed, size, power, etc.) may affect how the system achieves 3D projection. In one or more embodiments, the spatial light modulator may be a DLP. In one or more embodiments, a combination of spatial light modulators may be used (e.g., DLP and LCD). Similarly, other embodiments may utilize FSDs, LCDs, OLEDs, LCOS, etc. as the spatial light modulator.

In the illustrated embodiment, the spatial light modulator (504) may be a DLP and/or LCD. A standard DLP configuration uses a MEMs device and an array of micro mirrors that toggle between a mode of reflecting light toward the display or user to a mode of reflecting light away from the display or user, such as into a light trap. Thus, DLPs are inherently binary. DLPs typically generate grayscale images using a pulse width modulation schema wherein the mirror is left in the "on" state for a variable amount of time for a variable duty cycle in order to create a brighter pixel, or pixel of interim brightness.

Thus, to create grayscale images at moderate frame rate, DLPs run at a much higher binary rate. In the above described configurations, such a setup works well for creating grayscale masking. However, if the DLP drive scheme is adapted so that it is flashing sub-images in a binary pattern, then the frame rate may be increased significantly—by thousands of frames per second. This allows for hundreds to thousands of depth planes being refreshed at 60 frames/second.

A typical pulse width modulation scheme for a Texas Instruments DLP system has an 8-bit command signal (first bit is the first long pulse of the mirror; second bit is a pulse that is half as long as the first; third bit is half as long again; and so on)—so that the configuration can create 2 to the 8th power different illumination levels. In one embodiment, the backlighting from the DLP may have its intensity varied in sync with the different pulses of the DMD to equalize the brightness of the sub-images that are created, which is a practical approach to enable existing DMD drive electronics to produce significantly higher frame rates.

In another embodiment, direct control changes to the DMD drive electronics and software may be utilized to have the mirrors always have an equal on-time instead of the variable on-time configuration that is conventional, which would facilitate higher frame rates. In another embodiment, the DMD drive electronics may be configured to present low bit depth images at a frame rate above that of high bit depth images but lower than the binary frame rate, enabling some grayscale blending between focus planes, while moderately increasing the number of focus planes, as will be described further below.

In one implementation, a high-frame-rate and lower persistence display may be combined with a lower-frame-rate and higher persistence display to comprise a relatively high-frequency frame sequential volumetric display. In one embodiment, the high-frame-rate display has a lower bit depth and the lower-frame-rate display has a higher bit depth. These may be combined to comprise an effective high-frame-rate and high bit depth display that is well suited to presenting image slices in a frame sequential fashion. With such an approach, a three-dimensional volume that is desirably represented is functionally divided into a series of two-dimensional slices.

Or, a backlighted ferroelectric panel display also may be utilized in another embodiment. Instead of illuminating the back of the LCD panel in a conventional manner (i.e., with a full size fluorescent lamp or LED array), the conventional lighting configuration may be removed to accommodate using the DLP projector to project a mask pattern on the back of the LCD (in one embodiment, the mask pattern may be binary in that the DLP either projects illumination, or not-illumination; in another embodiment described below, the DLP may be utilized to project a grayscale mask image).

As shown in FIG. 5, the AR system (500) also comprises a VFE (510) that is configured to vary the focus of light generated by the spatial light modulator (504). As shown in FIG. 5, the light emitted from the spatial light modulator is directed to the VFE (510) that is configured to vary a focus of the light such that it may be viewed by the user at a plurality of depth planes.

In one or more embodiments, the VFE (510) focuses the projected light onto a desired depth plane. The VFE (510) may vary the focus of the projected light on a frame-by-frame basis. The depth plane corresponds to a depth (e.g., distance in the z direction) away from the user. It should be appreciated that VFEs are used in both multi-planar focus and variable plane focus systems. Thus, the VFE, in conjunction with the plurality of lenses and mirrors (e.g., 506, 508 and 520, as will be described below), is configured for projecting the light associated with one or more virtual objects at the desired depth plane(s) such that it is perceived as 3D to the eye of the user.

In one or more embodiments, the VFE (510) may be a refractive element, such as a liquid crystal lens, an electroactive lens, a conventional refractive lens with moving elements, a mechanical-deformation-based lens (such as a fluid-filled membrane lens, or a lens akin to the human crystalline lens wherein a flexible element is flexed and relaxed by actuators), an electrowetting lens, or a plurality of fluids with different refractive indices. The VFE may also comprise a switchable diffractive optical element (such as one featuring a polymer dispersed liquid crystal approach wherein a host medium, such as a polymeric material, has microdroplets of liquid crystal dispersed within the material; when a voltage is applied, the molecules reorient so that their refractive indices no longer match that of the host medium, thereby creating a high-frequency switchable diffraction pattern).

One embodiment includes a host medium in which microdroplets of a Kerr effect-based electroactive material, such as lithium niobate, is dispersed within the host medium. This enables refocusing of image information on a pixel-by-pixel or line-by-line basis when coupled with a scanning light display, such as a fiber-scanned display or scanning-mirror-based display. In a VFE configuration wherein liquid crystal, lithium niobate, or other technology is utilized to present a pattern, the pattern spacing may be modulated to not only change the focal power of the variable focus lens element, but also to change the focal power of the overall optical system—for a zoom lens type of functionality.

In one embodiment, the plurality of lenses may be telecentric, in that focus of the display imagery can be altered while keeping magnification constant—in the same way that a photography zoom lens may be configured to decouple focus from zoom position. In another embodiment, the lenses may be non-telecentric, so that focus changes will also slave zoom changes. With such a configuration, such magnification changes may be compensated for in software with dynamic scaling of the output from the graphics system in sync with focus changes.

As shown in FIG. 5, the focused light from the VFE (510) goes through a plurality of optical elements (506) that direct the light toward the user's eyes. In some embodiments, a beamsplitter (520) may be utilized. The beamsplitter (520) is an optical device that splits or directs an incident light beam, into two or more beams. In one or more embodiments, the beamsplitter (520) may be configured such that half of the incident light is reflected and the other half is transmitted due to total internal reflection. In the illustrated embodiment, the beamsplitter (520) may be utilized (depending on a design of the AR system) to split the beam such that it is directed to an eye piece (508). The eye piece (508) receives the reflected light from the beamsplitter (520), and directs the light into the user's eyes, as shown in FIG. 5.

Figure 6:
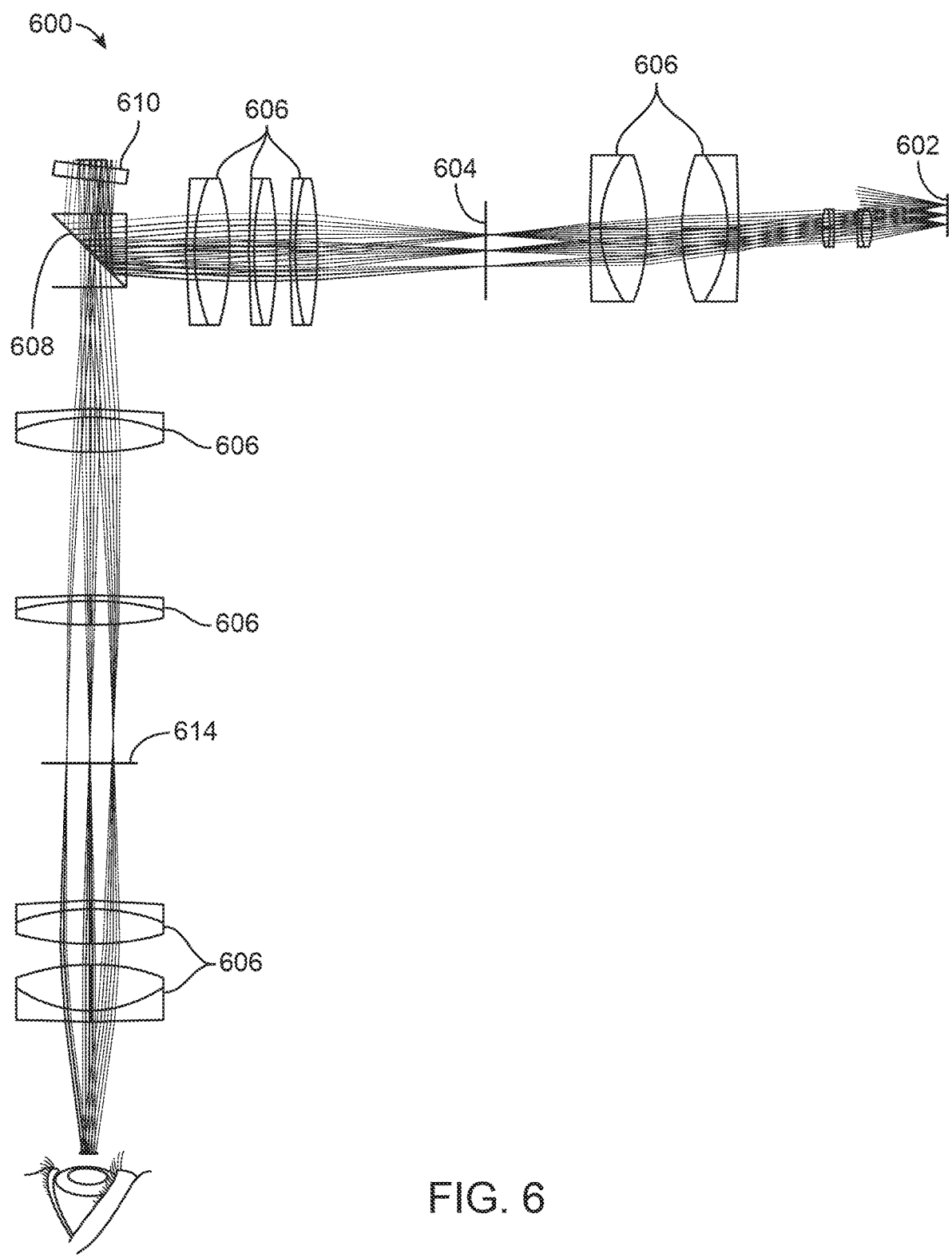
FIG. 6 illustrates is a plan view of one example configuration of the AR system of FIG. 5.

Having briefly described the overall system architecture, specific configurations of the various optical systems will now be described. Referring now to FIG. 6, an example embodiment of an AR system (600) will be described. In one or more embodiments, the AR system (600) includes a DLP (602), an LCD (604), a plurality of achromatic lenses (606), a beamsplitter (608) and a VFE (610). Although not shown, an image generating processor may sequentially feed a set of two-dimensional slices of virtual content (e.g., frame sequentially, time-sequentially, etc.) to the optical configuration shown in FIG. 6.

In the example configuration shown in FIG. 6, a combination of the DLP (602) and the LCD (604) is used to create a high refresh rate and high persistence display. It should be appreciated that other embodiments of the AR system (600) may utilize other spatial light modulators, and the following description is provided for illustrative purposes only. Advantageously, this approach allows the system to have both high frame-rate and high persistence (which allows the user to perceive multiple depth planes simultaneously). In the current embodiment, the combination of the DLP (602), and the LCD (604) operate at a processing power of 360 Hz, thereby generating 60 frames a second (e.g., generating 6 depth planes, as will be described in further detail below).

As will be described in further detail below, the high frame rate and high persistence of the DLP/LCD system allows for the creation of multiple depth planes that are perceived simultaneously by the user. Although the illustrated embodiment uses an LCD (604), it should be appreciated that alternate embodiments may not similarly use an LCD (604) in conjunction with the DLP (602). It should be appreciated that other forms of spatial modulators may be similarly used such as OLED, LCOS. FSDs, etc.

It should be appreciated that, in some embodiments, the DLP (602) provides grayscale images (as discussed above). The LCD (604) provides a color map, such that the light associated with various colors are projected through another set of achromatic lenses (606).

In the illustrated embodiment, light from the DLP (602) is projected toward a set of achromatic lenses (606). Similarly, the LCD (604) projects light associated with the same or different virtual content, and the light goes through another set of achromatic lenses (606).

Achromatic lenses (606) are optical elements that are designed to limit the effects of chromatic and spherical aberration. In other words, achromatic lenses (606) function similarly over a wide spectrum of wavelengths. For example, achromatic lenses (606) provide correction to bring two wavelengths to focus on the same plane. Achromatic lenses are typically made of two different types of materials and are designed to have a constant focus (or a small change in focus) over different wavelengths. Since the DLP (602) and the LCD (604) project light having a plurality of wavelengths (e.g., red, green, blue, etc.), the achromatic lenses (606) are utilized in order to ensure that the light of different wavelengths are brought to substantially the same focus. As shown in FIG. 6, achromatic lenses are used at various parts of the optical configuration (600) to ensure that the light is brought to the same focus (e.g., light emitted from the DLP (602), light emitted from the LCD (604), light from the VFE (610), light from the intermediate image plane (614), etc.).

As shown in FIG. 6, the light from the LCD (604) passes through another set of achromatic lenses (606), and approaches a beamsplitter (608). In the illustrated embodiment, the beamsplitter (608) splits the light beam such that it is directed to the VFE (610). It should be appreciated that the DLP (602) works in sync with the VFE (610) to provide a desired frame rate (e.g., 60 frames per second). The VFE (610) is configured to vary the focus of the frames to generate a plurality of fixed depth planes. In the current embodiment, the VFE (610) is a deformable mirror membrane VFE that is capable of changing the focus rapidly to accommodate the speed at which the frames are generated by the DLP (602) and the LCD (604). In one embodiment, the deformable membrane lens may be made of a very thin (e.g., the thickness of the membrane may be in the order of a few microns) reflective material, such as a deformable mirror membrane VFE (610) (e.g., made by Okotech®).

The focused light from the VFE (610) travels through two or more achromatic lenses (606) and produces an intermediate image plane (614). The intermediate image plane (614) is light having the appropriate focus, but it cannot be viewed by the user. It should be appreciated that the location of where the intermediate image plane (614) is generated varies within a range based on the focus of the VFE (610).

Light from the intermediate image plane (614) may further go through a set of achromatic lenses and/or magnifying elements such that it may be viewed by a user's eye. For example, the intermediate image plane may not be a real image by a virtual image, and may need to be inverted and/or modified to be processed by the eye. As shown in FIG. 6, light from the intermediate image plane (614) passes through another set of achromatic lenses and/or eye pieces before being delivered to the eye.

In the present example, it should be appreciated that the two achromatic lenses (606) closest to the eye are configured to collimate the light received from the VFE after the intermediate image is formed. Thus, in this particular embodiment, when the image is viewed by the eye, the image will appear as if coming from infinity. Collimated light (i.e. light beams that are parallel to each other) produces an image that is perceived as if coming from infinity. In other examples (not shown), when the VFE is focused on other depth planes (not optical infinity plane), the light rays will typically diverge such that the user views the depth plane at a fixed depth plane in the z direction (e.g., closer than optical infinity).

In the illustrated embodiment, the AR system (600) is a multi-planar focal system that uses a DLP (602) (and LCD (604) operating at a high processing power of 360 Hz, which allows for the creation of 6 depth planes at 60 frames/second. In the current technological landscape such a powerful DLP may work well in a stationary AR system configuration, but it should be appreciated that advances in technology may allow the same AR configuration to translate accordingly to portable or wearable AR systems.

Given that the DLP (602) operates at 360 Hz (60 frames/second), a different frame may be generated every 2.8 milliseconds. Coupling this with a fast and precise VFE (610) (such as the deformable mirror membrane VFE, as discussed above), allows for the rapid generation of multiple depth planes. Thus, it can be appreciated that the speed of the VFE (610) must be fast enough to quickly vary the focus (within 2.8 milliseconds, in this embodiment) such that the desired image/virtual content is displayed at the right depth plane.

Figure 7:
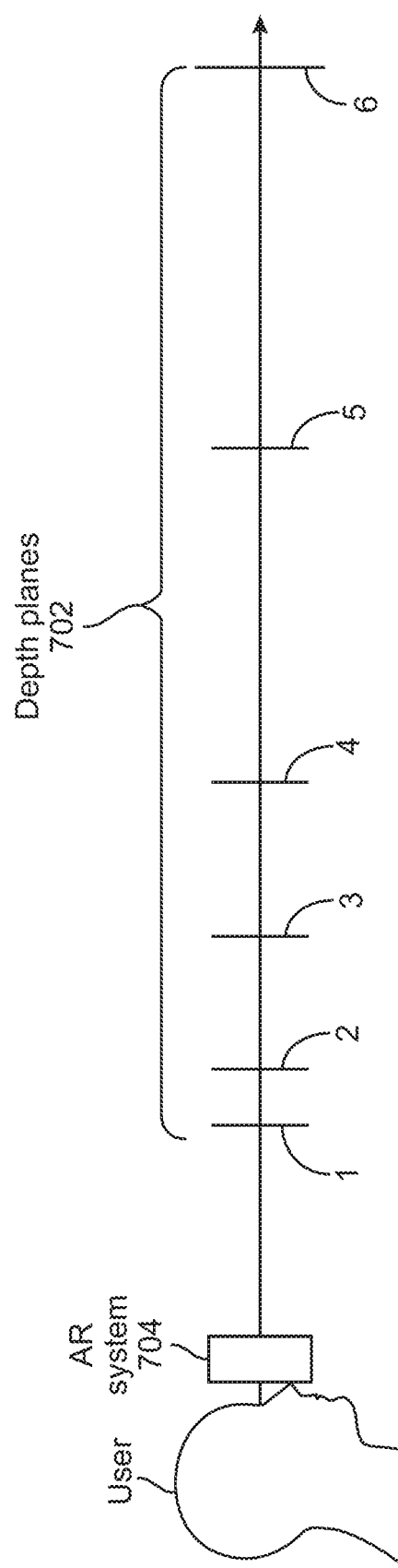
FIG. 7 illustrates an example embodiment of generation of multiple depth planes in the AR system of FIG. 5.

FIG. 7 illustrates how an AR system, such as the configuration discussed in relation to FIG. 6, generates multiple fixed depth planes with respect to a user. FIG. 7 illustrates an AR system (704) and a configuration of six depth planes (702) as viewed by the user of the AR system (704). In the illustrated embodiment, the six depth planes (702) are spaced at varying distances from the user in the z direction. In some embodiments, all six depth planes may be viewed simultaneously by the user at the fixed distances of the depth planes (e.g., the AR system (600)). In other embodiments, only a subset of the depth planes may be viewed per frame by the user, but the depth planes may always be generated at the same fixed distance away from the user.

It should be appreciated that the AR system (704) (e.g., such as the AR system (600)), and other multi-planar focal systems typically display frames at fixed depth planes (702) (e.g., six depth planes as shown in FIG. 7). Although any number of depth planes may be similarly used, the following disclosure will discuss the multi-planar focal system as having six fixed depth planes (702) in the z direction. In generating virtual content on one or more of the six depth planes, 3D perception is created such that the user perceives one or more virtual objects at varying distances from his/her eye (e.g., in the z direction). Given that the human eye is more sensitive to objects that are closer in distance than objects that appear to be from far away, more depth planes (702) are generated closer to the eye, as shown in FIG. 7. In other embodiments, the depth planes (702) may be placed at equal distances away from each other.

Depth planes (702) are typically measured in diopters, which is a unit of focal length. For example, in one embodiment, depth plane 1 may be ⅓ diopter away, depth plane 2 may be ½ diopter away, depth plane 3 may be 1 diopter away, depth plane 4 may be 1.5 diopters away, depth plane 5 may be 3 diopters away, and depth plane 6 may represent infinity. It should be appreciated that other embodiments may generate depth planes at other distances/diopters. Thus, in generating virtual content at strategically placed depth planes, the user is able to perceive virtual objects in 3D.

For example, a first virtual object may be perceived on depth plane 1, while another virtual object may be perceived as originating at infinity on depth plane 6. Or the virtual object may first be displayed at depth plane 6, then depth plane 5, and so on until the virtual object appears very close to the user (e.g., a virtual monster running toward the user). In another embodiment, all six depth planes may be concentrated on particular focal distance away from the user. For example, if the virtual content to be displayed is a coffee cup half a meter away from the user, all six depth planes could be generated at various cross-sections of the coffee cup, giving the user a highly granulated 3D view of the coffee cup. It should be appreciated that the above examples are highly simplified for illustrative purposes, and many other configurations of depth planes may be similarly envisioned.

In the case of the AR system (600) of FIG. 6, the high processing power of the DLP (602) and the LCD (604) combined with the ability of the deformable mirror membrane VFE (610) to quickly change the focus, allows for rapid generation of depth planes at varying distances from the user. This, combined with the persistence of the display gives a perception of simultaneous multiple depth planes. For example, depth plane 1 (e.g., focused at ⅓ diopter) may be created at the first 2.8 milliseconds, depth plane 2 (e.g., focused at ½ diopter) may be created at the next 2.8 milliseconds (5.6 milliseconds) and so on until the sixth depth plane (e.g., focused at infinity) is created at 16 milliseconds.

In other words, the high speed at which the spatial light modulator (e.g., DLP (602)) operates (allowing for rapid generation of virtual content) coupled with the deformable mirror membrane VFE 610 (allowing rapid changes in focusing the image at the desired depth plane) provides a multi-planar focal system that is able to rapidly project multiple depth planes to the user. Given the high speed at which depth planes are generated (all 6 image planes are generated within the first 16 milliseconds), the human eye perceives them as simultaneous depth planes. In other words, due to persistence of the eye, all 6 depth planes are essentially viewed together.

Due to restrictions of size and portability, a DLP of such high processing power (360 Hz) may not easily be used in wearable versions of the AR system. Furthermore, the deformable mirror membrane VFE that is used in the AR system (600) may be extremely thin and therefore highly sensitive to changes in the external environment, which may make it difficult to use in a wearable AR system model. However, it should be appreciated that the system (600) may utilize other VFEs or other spatial light modulators and may function similar to the description above.

Figure 8:
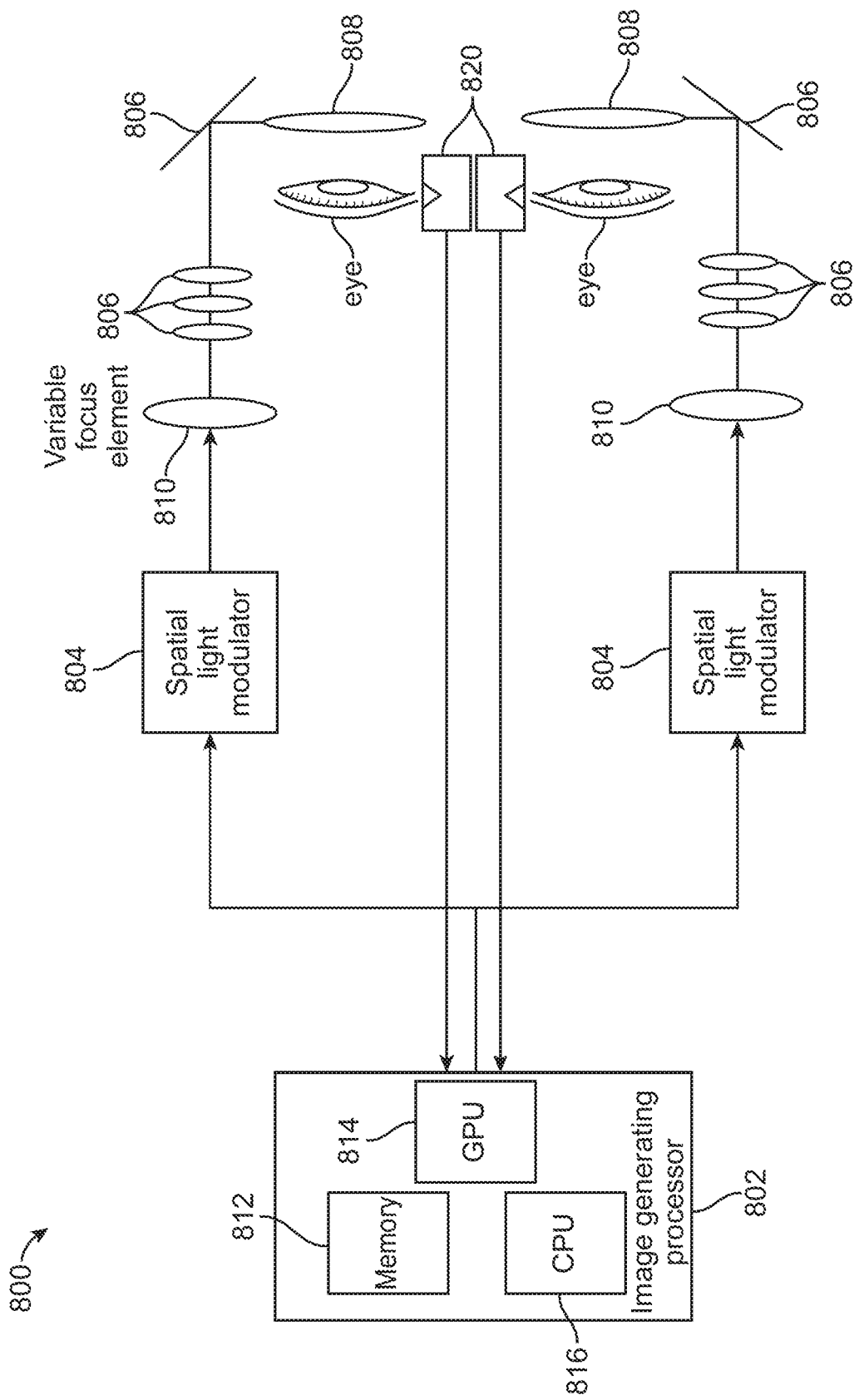
FIG. 8 illustrates a plan view of one embodiment of an AR system that is configured to be a variable plane focal system.

Turning now to FIG. 8, an example embodiment of one version of a wearable AR system (800) will now be described. Similar to the AR system (500), the AR system (800) also includes an image generating processor (802) (e.g., with additional components: GPU (814), CPU (816), and memory (812)), a spatial light modulator (e.g., DLP, LCD, OLED, LCOS, FSD, etc.) (804), a plurality of lenses/optical elements and mirrors (806), a VFE (810), a meniscus lens or eyepiece (808), and an eye tracking sub-system (820). It should be appreciated that the AR system (800) may be utilized in various configurations. One configuration may be a "birdbath" configuration that refers to a helmet configuration that houses a set of optical elements and spatial light modulator at the top of the AR device (e.g., a helmet form factor of the AR device similar to FIG. 4B), such that the light travels down the spatial light modulator and the set of optics and is fed to a top of an eye piece. In other configurations, the set of optics and spatial light modulators may be housed at the side, such that the light travels laterally through the spatial light modulator and the set of optical elements and is fed to a side portion of an eye piece (e.g., a form factor similar to FIG. 4C).

Many of the components of the AR system (800) are similar to the AR system (500) described above, and therefore, will not be repeated. As discussed above, the processor (802) provides one or more image slices or frames to the spatial light modulator (804). In one or more embodiments, the spatial light modulator (804) may comprise a DLP, an LCD, LCOS, OLED or an FSD. As discussed above, the portable versions of the AR system may not accommodate a large and powerful spatial light modulator, such as the one used in the AR system (e.g., FIG. 6); therefore a smaller and/or less powerful spatial light modulator (e.g., DLP) may be utilized instead. In the illustrated embodiment, the DLP may operate at around 120 Hz, generating 60 frames/second.

The light from the spatial light modulators (804) may then be focused by the VFE (810) such that the image is viewed by the user at a desired depth plane. As discussed above, the VFE (810) used in wearable configurations may be more durable, but also slower than that used in the AR system (600). Similarly, the VFE (810) used in this embodiment may not be deformable mirror membrane as used in the AR system (600), but may rather be an opto-refractive membrane lens, such as ones made by companies like Optotune® or Varioptic®. In one or more embodiments, the membranes associated with these VFEs tend to have a rubbery texture, which makes it more durable, as compared to the deformable membrane mirror used in the AR system (500), thereby making these VFEs more suitable for wearable versions of the AR system.

In the current embodiment, given that frames are only generated at 20 frames/second, the VFE only switches focus at 20 frames/second. To this end, rather than simultaneously displaying all six depth planes at once, a single depth plane is generated to coincide with the user's focus, as will be described further below. Similar to FIG. 5, the light from the VFE goes through a set of optical elements (806 and 808) and is conveyed to the user's eyes.

As discussed above, the AR system (800) is a variable focal plane system. Rather than producing six (or more) depth planes, the system is configured to create a single depth plane that may be moved in the z direction such that the created depth plane coincides with the user's focus.

To this end, in addition to the above described elements (that were also present in the previous embodiment), the current embodiment also includes an eye-tracking subsystem (820) that is configured to track the focus of the eyes. Each eye may be tracked separately and independently of the other. In one or more embodiments, each eye may be tracked by a dedicated eye tracking system. In other embodiments, both eyes may be tracked by a single eye tracking system. In another embodiment, a single eye tracking system may have two trackers, one configured for each eye. The eye-tracking subsystem (820) may be physically or communicatively coupled to the image generation processor (802) and other circuitry such that the VFE (810) focuses the image on a plane that coincides with the focus of the user's eyes.

In one or more embodiments, the eye-tracking subsystem (820) measures the distance at which the two eyes converge. For example, if the user's eyes are parallel to one another, the eye-tracking subsystem (820) may determine that the user's focus is at optical infinity. Other embodiments of the eye-tracking subsystem (820) may use other methods in estimating or determining the focus of the user's eyes. It should also be appreciated that the eye-tracking subsystem (820) may comprise processing/control circuitry etc., and is further configured to communicate with the image generating processor and other components of the system. The rest of the components of the system are similar to the previous system (500) described above.

Figure 9:
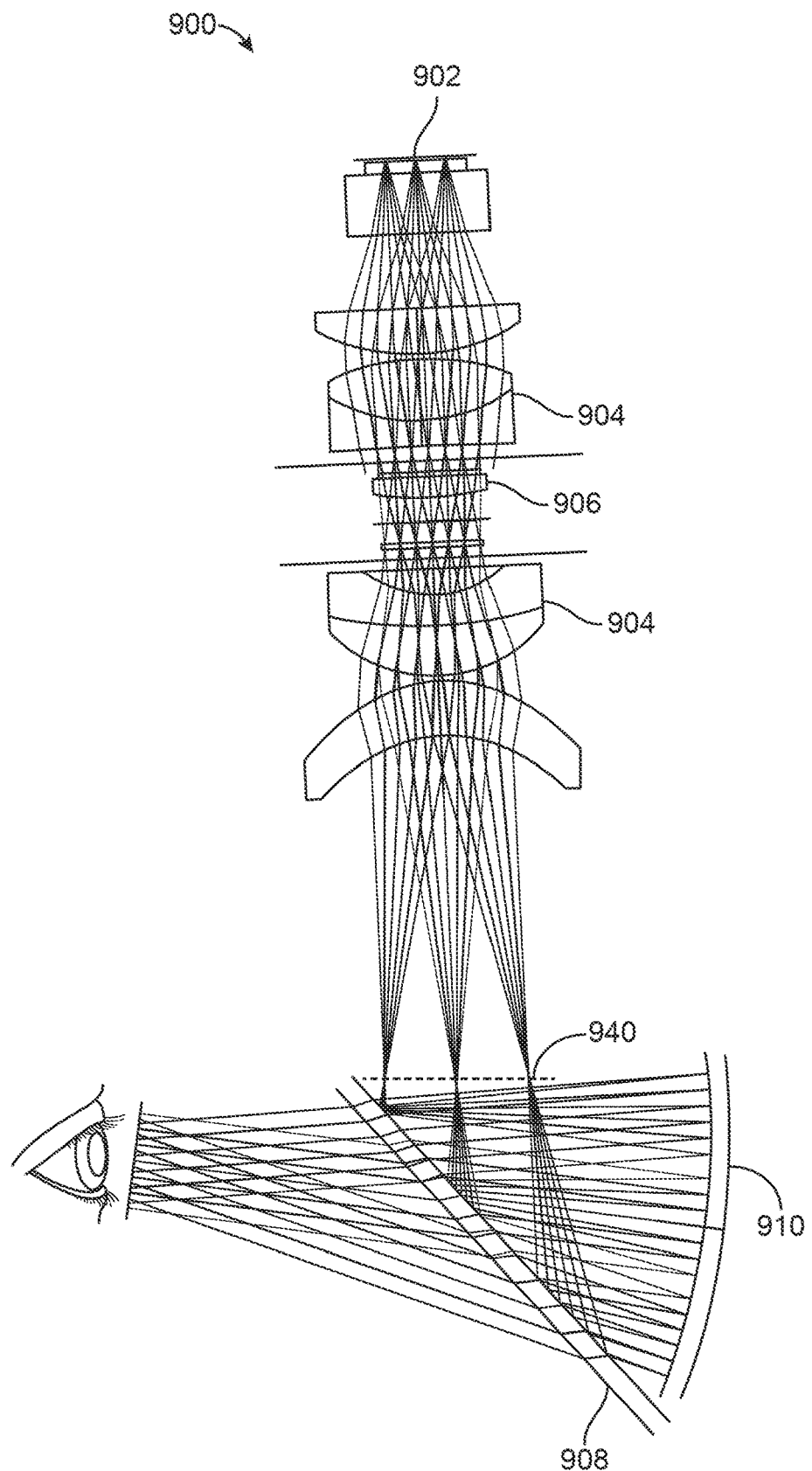
FIG. 9 illustrates a plan view of one example configuration of the AR system of FIG. 8.

Referring now to FIG. 9, a specific configuration (900) of a variable plane focal system (e.g., AR system (800)) will be now described. In the present embodiment, the variable plane focal system (900) includes a DLP (902), a set of achromatic lenses (904), a VFE (906), a beamsplitter (908), an intermediate image plane (940), and a meniscus lens (910).

As shown in FIG. 9, light associated with various virtual images slices/frame slices (e.g., fed by a processor (not shown)) is projected from the DLP (902). The light from the DLP (902) travels through a set of achromatic lenses (904) (e.g., which modify the focus of light of different wavelengths to substantially have the same focus, as discussed above) and are fed to a VFE (906).

The VFE (906), as discussed above, focuses the light such that the light appears to be coming from a desired plane. Although the eye-tracking sub-system is not shown in FIG.

9, it should be appreciated that the image is typically created based on input from the eye-tracking subsystem. In other words, data from the eye-tracking system is communicated to the VFE, and the VFE accordingly creates a depth plane that is closest to the user's current state of focus.

Once the VFE (906) has focused the light accordingly, the light then travels through another set of achromatic lenses (906), such that an intermediate image plane (940) is created. As discussed above, the light corresponding to the intermediate image plane (940) must be modified before it may be viewed by the eye, and therefore, in some embodiments, may go through a beamsplitter (908) and a meniscus lens or eye piece (910) that directs the light to the user's eye.

The beamsplitter (908) splits the light beam and reflects the light toward the meniscus (910). The meniscus lens (910) then directs the light into the user's eye.

In the illustrated embodiment, the light reaching the user's eyes is collimated (e.g., the user perceives the light as coming from optical infinity). Of course, when focusing on different depth planes, the light beams may instead diverge, as though coming from a depth plane closer than optical infinity.

Figure 10:
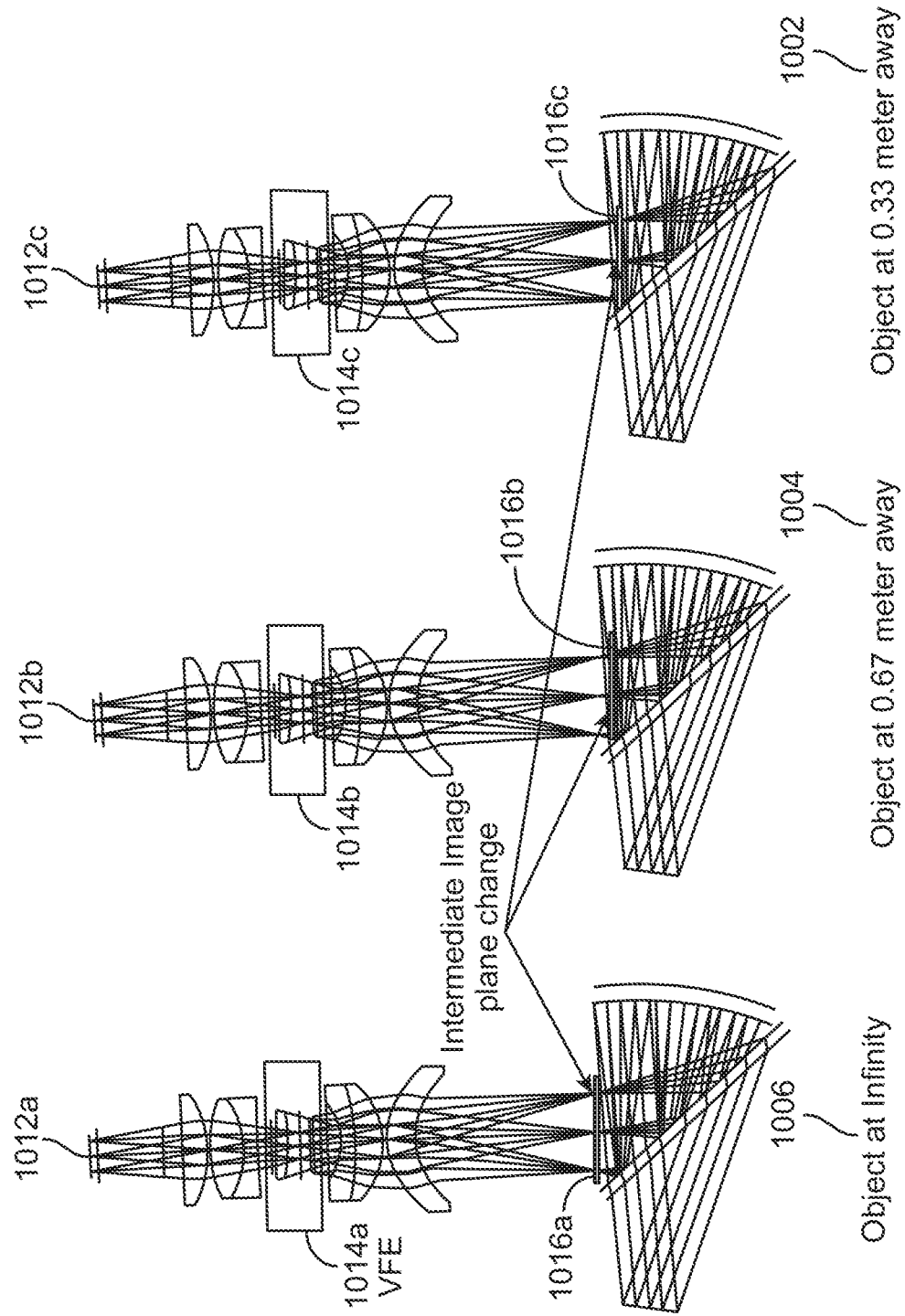
FIG. 10 illustrates plan views of the AR system of FIG. 8 when changing the focus to three different depth planes.

Referring now to FIG. 10, an example series of configurations of the variable plane focus system are illustrated. The various configurations comprise the same components as discussed with respect to FIG. 9, and therefore will not be repeated.

In the illustrated embodiment, in (1002), the VFE (1014*c*) focuses the light from the DLP (1012*c*) to a depth plane that is 0.33 meters away from the user. As shown in FIG. 10, right side, the intermediate image plane (1016*c*) is generated based on the change in the focus of the VFE (1014*c*). In (1004), the VFE (1014*b*) focuses the light from the DLP (1012*b*) to a depth plane that is 0.67 meters away from the user. As shown in FIG. 10, middle, the intermediate image plane (1016*b*) is generated based on the change in the focus of the VFE (1014*b*). Similarly, in (1006), the VFE (1014*a*) focuses the light from the DLP (1012*a*) to a depth plane that is at optical infinity. As shown in FIG. 10, middle, the intermediate image plane (1016*b*) is generated based on the change in the focus of the VFE (1014*b*). In the illustrated embodiment, the intermediate image plane (e.g., 1016*a*, 1016*b* and 1016*c*) also varies as the VFE varies the focus of the light to different depth planes.

Figure 11:
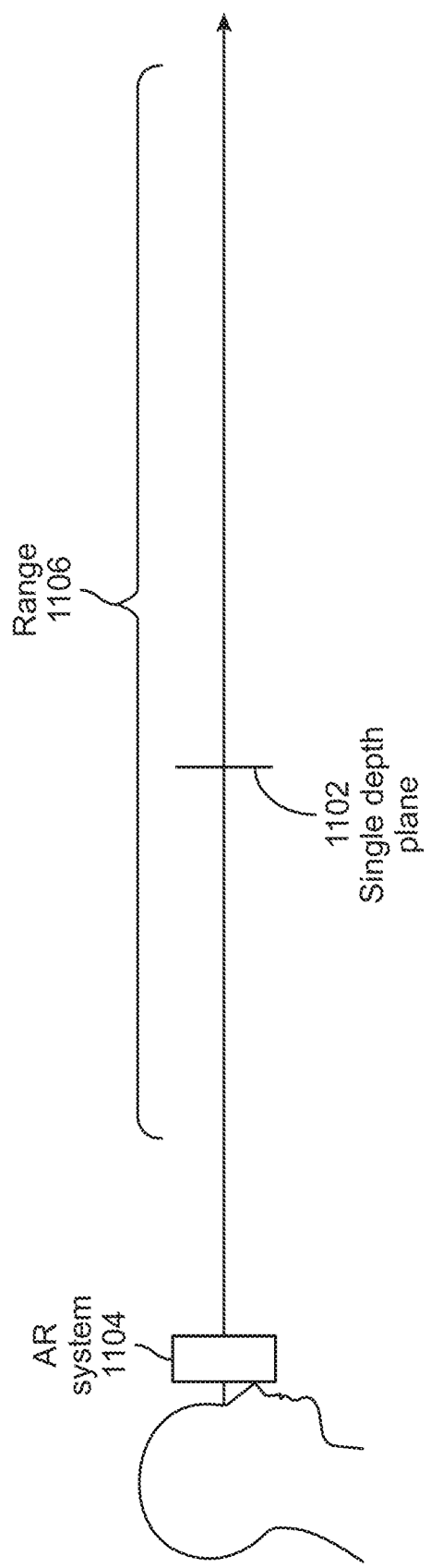
FIG. 11 illustrates an example embodiment of generation of a single depth plane in the AR system of FIG. 8.

FIG. 11 illustrates how a variable-plane AR system, such as the configuration discussed in relation to FIG. 8-10, generates a single depth plane that may be laterally translated with respect to the user. FIG. 11 illustrates an AR system (1104) and a single depth plane (1106) as viewed by the user of the AR system (1104). In the illustrated embodiment, a single depth plane is generated, but the single depth plane (1102) (for each frame) may be moved within a range (1106) in the z direction.

In other words, the variable plane focus system (e.g., FIGS. 8-10) laterally translates a single depth plane within a range in the z direction based on the user's current state of focus. If the user's eyes are focused on a physical object that is proximate to the user, the single depth plane is moved such that it coincides with that focal distance and the virtual object is displayed at that depth plane. For example, if the user's eyes are relaxed and are looking out into space (the eyes are parallel to each other), the depth plane may be moved further out such that the virtual object appears to be coming from infinity. As shown in FIG. 11, the AR system (1104) focuses the image on a single depth plane (1102) that coincides with the user's focus. The single depth plane (1102) may be moved within a range (1106) to any distance away from the user in the z direction (e.g., very close to the user to optical infinity), as shown in FIG. 11.

To compensate for the fact that only one depth plane is projected (e.g., at 60 frames/second), blurring software techniques may be utilize to provide a perception of multiple depth planes. Assuming more than one virtual object is intended to be projected to the user, and assuming the virtual objects are meant to be at different depth planes, the system may blur out virtual objects that are not in the projected depth plane. In other words, both virtual objects are rendered on the single depth plane but one (or more of them) (that are intended to appear closer/farther away as compared to the user's focus) will appear blurred to the user.

For example, if the virtual content comprises both a virtual coffee cup and a dragon that is flying in the background, if the user's eyes are focused on a desk, the single depth plane will be generated at the user's focus and will consist of the virtual coffee cup in focus, but will additionally also show a blurred version of the dragon flying in the background. Or if the user's eyes are focuses toward infinity, the single depth plane will be generated at infinity, but the dragon may appear in focus while the coffee cup is blurred through software blurring.

Or, continuing with the same example, if the user's eyes turn toward the dragon, the eye-tracking system (820) may detect the shift in focus (e.g., the eye-tracking subsystem may detect the change in the convergence of the user's eyes), and then render the dragon in focus and blur out the coffee cup, but this time, the single depth plane is generated at infinity. It should be appreciated that the human eye takes on the order of 200-300 milliseconds seconds to change its focus from near objects to far away objects or vice versa. However, the AR system is configured to generate frames rapidly at about 60 frames a second. Thus, since the AR system is operating at a faster pace when compared to the human eye, the user eyes are able to comfortably adjust to the change in focal plane.

Thus, as can be appreciated from the examples above, in order to create 3D perception, the variable plane focus system creates one (or more) limited depth plane that is projected at a depth plane that coincides with the focal distance of the user's eyes. By using the eye-tracking subsystem (820), the AR system (800) is able to use a spatial light modulator of smaller processing power, and a slower VFE, as discussed above.

It should be appreciated that the accuracy of the variable plane focus system is directly related to the accuracy and efficiency of the eye-tracking subsystem and the speed of the VFE element. The eye-tracking subsystem (820) must be able to quickly measure and determine the focal distance of the user's eyes, and the VFE element must precisely focus the depth plane at that distance. This takes a lot of processing power and speed, which are typically limitations in wearable AR systems, as discussed at length above. To this end, in yet another embodiment of the AR system, a hybrid system may be used to generate 3D virtual content.

Figure 12:
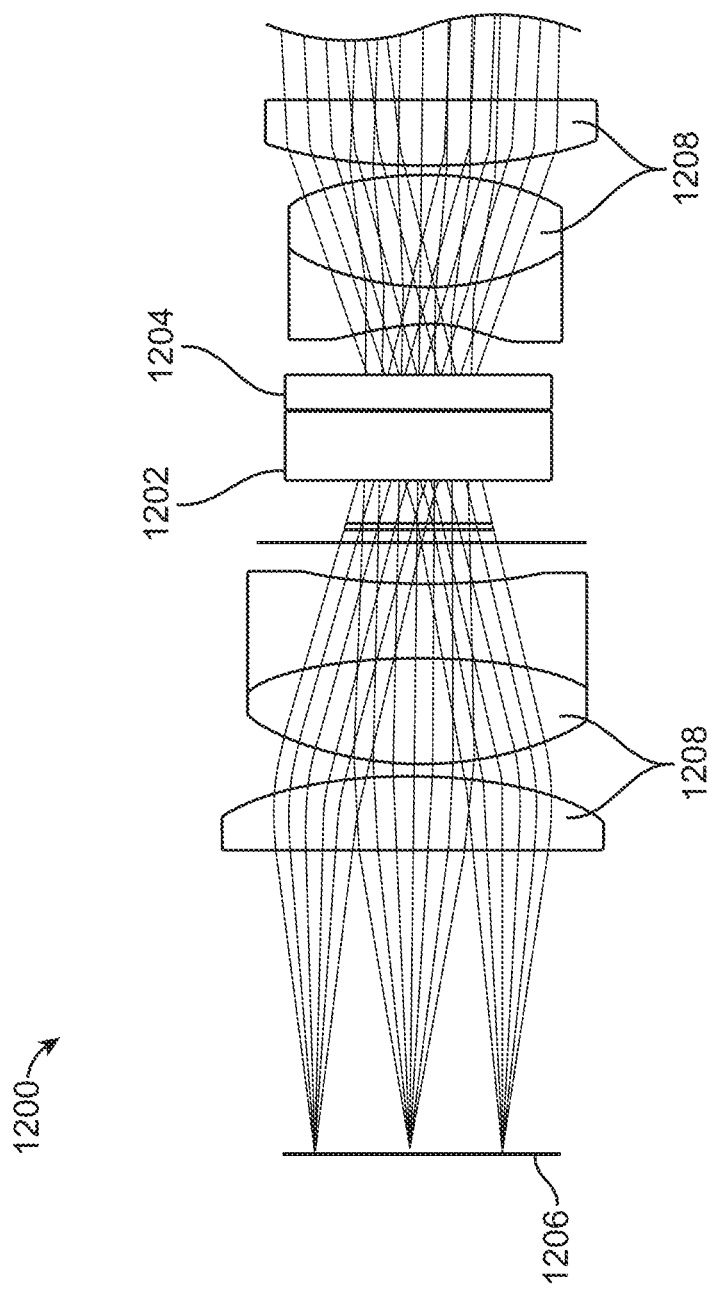
FIG. 12 illustrates a plan view of an example configuration of a hybrid AR system.

Referring now to FIG. 12, a hybrid configuration similar to the AR systems of FIGS. 9 and 10 will be described in further detail. The hybrid AR system (1200) comprises substantially the same elements as the AR system (900) of FIG. 9. For the purposes of brevity, only the key components of the hybrid AR system (1200) will be described, and it should be recognized that the remaining components will work similar to that configuration of FIG. 9.

As shown in FIG. 12, light from the DLP (1206) may project light associated with 2D slices of virtual content. The light may then go through a set of achromatic lenses (1208)

that are configured to ensure that light of different wavelengths are brought to substantially the same focus, as discussed above. The light from the achromatic lenses (1208) then hit a VFE assembly having a long-range VFE element (1202), and a two-state focus element (1204).

In the hybrid AR system (1200), rather than using a single VFE, the system utilizes both a long-range VFE element (1202) and a two state focus element (1204). The long range VFE (1202) is configured to function along a large range of depth planes (similar to the variable plane system of FIG. 11), while the two state focus element (1204) is configured to generate two depth planes within a small range of one another (similar to the multi-plane system of FIG. 7).

The long range VFE element (1202) may, for instance, be capable of relative large focus range, such as 0-3 diopters. Such a VFE (1202), may, for the purposes of illustration, be limited in its temporal response time. If used in isolation, such a long range VFE (1202) may adjust the focus over the course of multiple displayed frames from a operatively coupled image source, but may not be fast enough to modulate between desired focal states on a frame-by-frame basis at the refresh rate of the operatively coupled display. For instance, the long range VFE (1202) may adjust display focus in response to a change in human accommodation or vergence or in response to the motion of elements within a displayed volumetric scene.

The two state focus VFE labeled (1204) may comprise a VFE that can switch between focal states more rapidly that VFE (1202), but may be limited in its total focal range (e.g., 0 to 0.3 diopters) and/or the number of focus states in can produce (e.g., two focus states). By placing the long range VFE (1202) and two state VFE 1204 in series, their total optical power is combined, such that the focus state of each VFE affects the focus of an operatively coupled display.

For example, if the two depth planes need to be created at a distance of 1 diopter, the long range VFE (1202) may be configured to focus both depth planes approximately at 1 diopter distance, while the two state focus element (1204) may be configured to generate two depth planes within a short distance of each other (e.g., a fixed distance of 0.3 diopters from each other). In other words, the long range VFE (1202) focuses the two depth planes at approximately the right distance away from the user in the z direction, while the two state focus element (1204) places two depth planes in relation to one another. In one or more embodiments, the distance between the two depth planes may be fixed. The light exiting the combined VFE (1202 and 1204) may then go through another set of achromatic lenses (1208), and remaining set of components (not shown) similar to that of FIG. 9, before hitting the user's eyes.

The hybrid system (1200) combines elements of both the multi-plane focal system and the variable plane focal system. To account for deficiencies in the eye-tracking subsystem and/or VFE, rather than generating a single depth plane that is generated based on tracking the user's eyes, the hybrid system (1200) generates two depth planes that are close to each other at a focal distance determined by the eye-tracking system. Thus, it can be appreciated that the hybrid system (1200) builds in an allowance of error in the eye-tracking subsystem and accounts for deficiencies by projecting the virtual content not just at one depth, but two depth planes that are in close proximity to each other. It should be appreciated that the two depth plane system described here is an example only, and other embodiments may comprise three or more depth planes that are all projected so as to coincide with a user's focus.

For example, if it is determined (e.g., through the eye-tracking subsystem) that the user's eyes are focused at a distance of 1 diopter, instead of generating a single depth plane at that distance, the hybrid system (1200) may instead generate two depth planes, both of which are close to 1 diopter, and split the virtual content such that half of it appears at one depth plane and the other half appears on the other depth plane. Thus, both depth planes are simultaneously perceived by the user (e.g., one frame generated at depth plane 1 at 8 ms and another frame generated at depth plane 2 at 16 ms). This creates a more comfortable viewing for the user, and doesn't rely heavily on the eye-tracking subsystem. Assuming DLPs operating at 120 Hz are used, the hybrid AR system (1200) may be configured to generate two depth planes at 60 frames/second.

Figure 13:
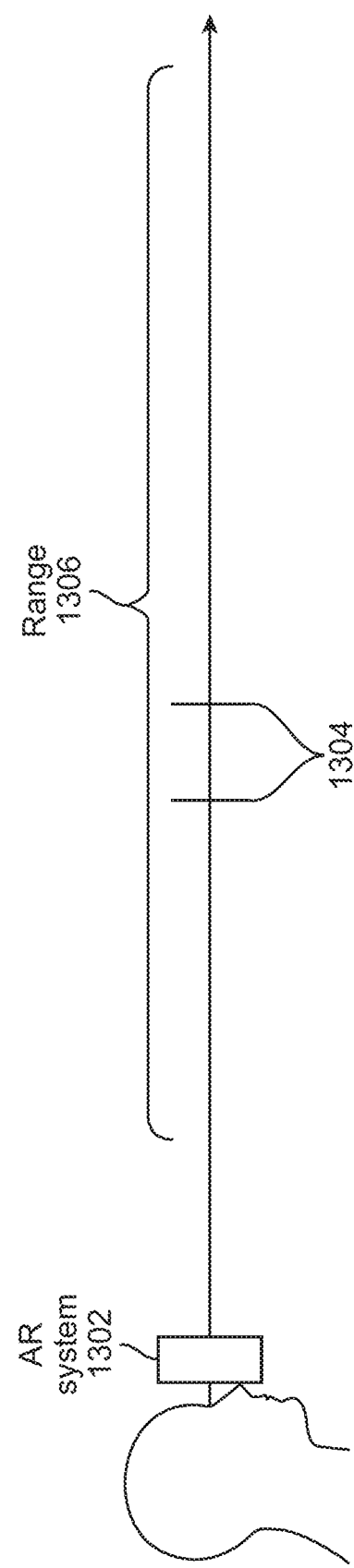
FIG. 13 illustrates an example embodiment of generation of two depth planes in the AR system of FIG. 11.

FIG. 13 illustrates how a hybrid AR system, such as the configuration discussed in relation to FIG. 12, generates two depth planes in relation to each other that may be laterally translated with respect to the user. FIG. 13 illustrates an AR system (1302) and two depth planes (1304) as viewed by the user of the AR system (1302). In the illustrated embodiment, two depth planes (1304) are generated within a fixed distance of each other, and the two depth planes (1304) may be laterally translated within a range (1306) in the z direction.

As described above, generating two depth planes (1304) rather than a single depth plane may make up for the errors in the eye-tracking subsystem (820) or the precision of the VFE when generating a single depth plane. Here, once the approximate location of the desired depth plane has been determined through the eye tracking system (820), two depth planes are created in close proximity (e.g., fixed distance in relation to each other) to one another.

In yet another embodiment, instead of using VFEs in conjunction with one or more lenses to generate the plurality of the depth plane(s), depth planes may be similarly generated through the use of volume phase holograms or waveguides that are embedded with depth plane information. In other words, a diffraction pattern, or diffractive optical element (DOE) may be embedded within a planar waveguide such that as a collimated beam is totally internally reflected along the planar waveguide, it intersects the diffraction pattern at multiple locations.

Figure 14:
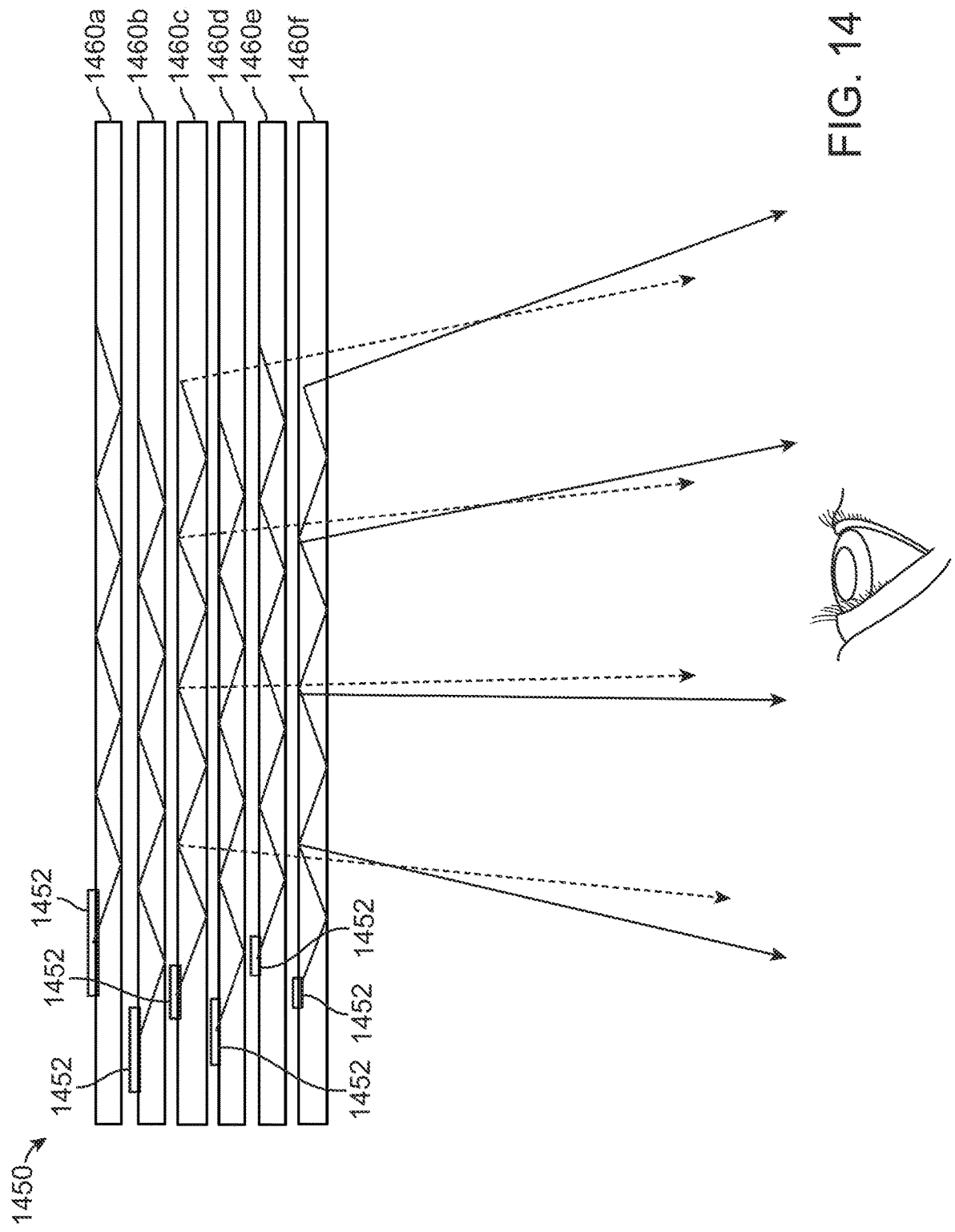
FIG. 14 illustrates a plan view of one embodiment of an AR system that includes a stack of waveguides to create multiple depth planes.

Referring now to FIG. 14, a stack of waveguides (1430), each having a different DOE embedded within the respective waveguide will be described in further detail. The stack of waveguides (1430) comprises six waveguides each having separate DOEs (1460a-1460f) and in-coupling gratings (1452) for each waveguide. Each of the waveguides comprise a different DOE pattern that diffracts light to a different depth plane.

Figure 15:
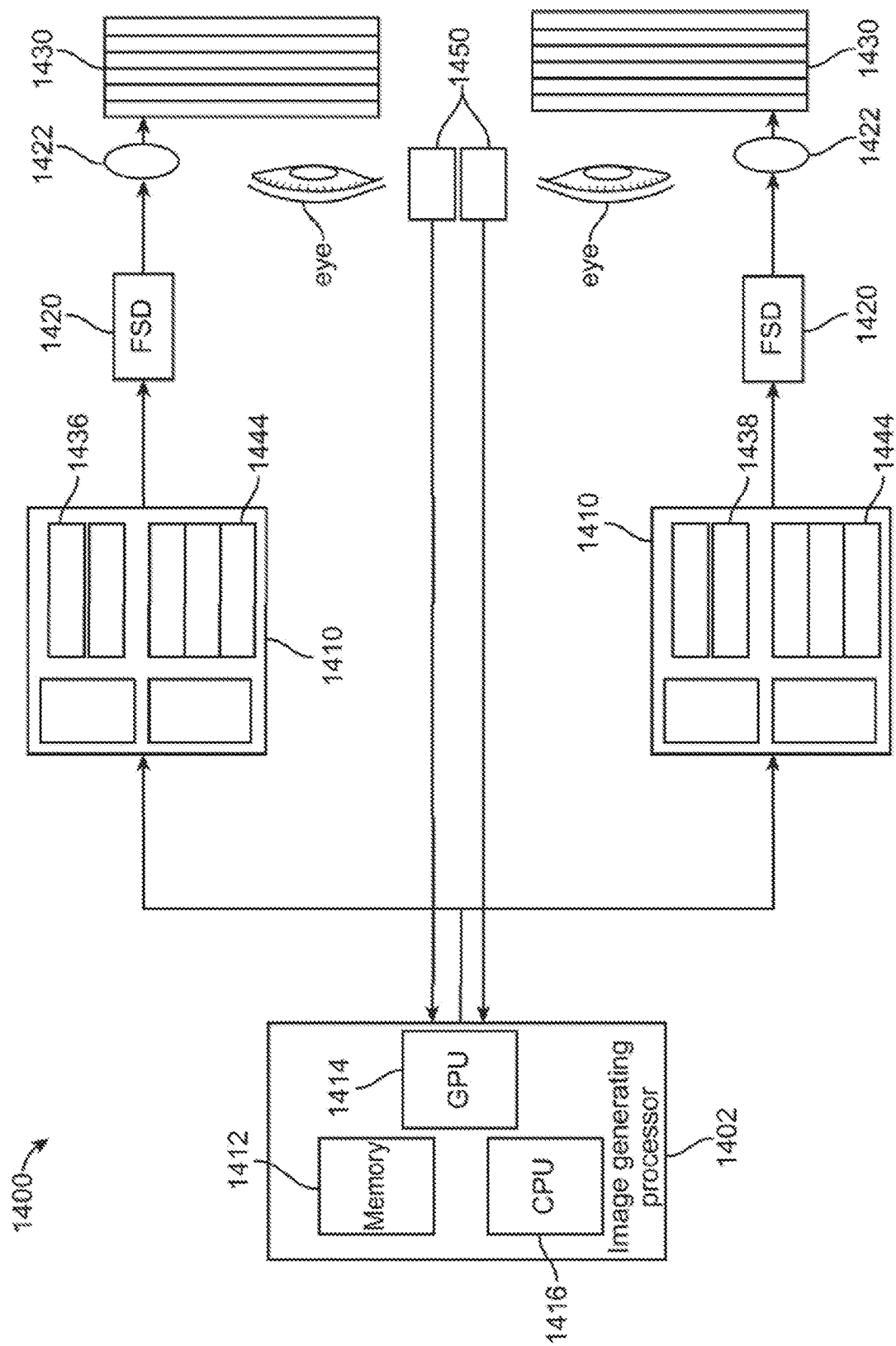
FIG. 15 illustrates a plan view of one embodiment of a stack of waveguides.

The in-coupling grating refers to an opening in the waveguide (e.g., 1460a-1460f) through which light from a spatial light modulator is injected. As shown in FIG. 14, the injected light travels through each waveguide through total internal reflection, and intersects the embedded diffraction pattern in each of the waveguides at different angles and at different locations. Some of this light is then transmitted through the waveguide and into the user's eyes, as shown in FIG. 15.

It should be appreciated that each of the waveguides may diffract the light differently based on the embedded diffraction pattern. For example, the waveguide having a first DOE (1460a) may collimate light associated with any image that is injected into the waveguide (1460a) through the in-coupling grating (1452). Another waveguide having a second DOE (1460f) may be configured to diverge the light to a depth plane corresponding to 1 diopter. Yet another waveguide having yet another DOE (1460*e*) may be configured to diverge the light to a depth plane corresponding to 2 diopters, etc. As shown in FIG. 14, the light exiting waveguide (1460*f*) corresponds to a different angle as compared to the light exiting waveguide (1460*e*). Thus, the various DOEs embedded within the waveguides emit light at varying angles, which are then perceived by the user as coming from different depth planes.

It should be appreciated that a key difference between the AR system (1400) of FIG. 14, as compared with the previous systems is that the DOE in each of the waveguides acts as a VFE, thereby obviating the need for a separate VFE. Thus, advantageously, image slices (or planes) may be fed to the appropriate waveguide in order to produce the desired depth plane.

For example, a first waveguide of the stack of waveguides may have a first diffraction pattern that is configured to deliver collimated light to the eye, which may be representative of the optical infinity depth plane. Another waveguide may be configured to deliver the injected light such that it appears to be coming from a distance of 1 meter. Yet another waveguide may be configured to deliver the injected light such that it appears to be coming from a distance of 2 meters. By using a stacked waveguide assembly, it can be appreciated that multiple depth planes may be created, with each waveguide configured to display the image at a particular depth plane. It should be appreciated that although any number of waveguides/holograms may be used, the following discussion will focus on six stacked holograms configured to generate six depth planes. In other words, rather than using a VFE that rapidly switches focus between different depth plane states, the waveguides themselves serve as VFEs, and the light is injected into one (or more waveguides) depending on the desired depth of focus.

It should be appreciated that the stacked waveguides may further be configured to be dynamic, such that one or more waveguides may be turned on or off. In one embodiment, one or more waveguides having the diffractive optical elements are switchable between "on" states in which the diffractive optical elements actively diffract, and "off" states in which the diffractive optical elements do not significantly diffract. For instance, switchable DOE waveguides may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light). In another embodiment, the microdroplet can be switched to an index that does not match that of the host medium (in which case the pattern actively diffracts incident light). More details about the waveguides having diffractive optical elements are described in U.S. patent application Ser. No. 14/555,585 filed on Nov. 27, 2014 and entitled "VIRTUAL AND AUGMENTED REALITY SYSTEMS AND METHODS", the content of the aforementioned U.S. provisional patent application is hereby expressly incorporated by reference for all purposes.

Referring now to FIG. 15, an example embodiment of the AR system (1400) that uses a stack of embedded diffractive guide elements will now be described. The AR system (1400) generally includes a processor (1402) (e.g., also comprising additional components: memory (1412), GPU (1414), CPU (1416), etc.), at least one FSD (1420), FSD circuitry (1410), a coupling optic (1422), and at least one set of stacked waveguides having diffractive elements (1430). The system (1400) may (optionally) include an eye-tracking subsystem (1450).

Many of the components of the AR system (1400) are similar to the AR system (500) and (800) described above, and therefore, will not be repeated. As discussed above, the processor (1402) provides one or more image planes to the spatial light modulator which may be an FSD circuitry (1420), as shown in FIG. 15. In the illustrated embodiment, one FSD (1420) is used per eye. The FSD (1420) corresponds a FSD circuitry (1410) that facilitates a functioning of the FSD (1420).

It should be appreciated that other embodiments may have multiple FSDs per eye (e.g., one for each waveguide), but the following disclosure will focus on the example embodiment of FIG. 15. Although the illustrated embodiment uses FSDs as the spatial light modulator, any other spatial light modulator (e.g., DLP, OLED, LCDs, LCOS, etc.) may be similarly used.

It should be appreciated that the FSD (1420) is compact and has high resolution, when compared to many other spatial light modulators. Thus, it may have significant utilities in wearable versions of the AR system. At its core, the FSD (1420) includes one or more optical fibers that vibrate rapidly to create various patterns in order to deliver the image.

In one or more embodiments, the FSD (1420) may comprise a single optical fiber, or, in other embodiments, multiple optical fibers that may break the light into multiple channels. In such implementations, the optical fibers may have staggered tips or beveled or polished tips to bend the light, reducing optical spanning between the channels. The optical fibers may be conveniently packaged as a ribbon cable. Suitable optics may produce a conjugate of the respective images produced by each of the channels. The FSD (1420) also includes a FSD circuitry (1410, described above), a piezoelectric transducer (1438) and a set of electrodes (not shown) that are radially arranged about the piezoelectric transducer.

Applying control signals e.g., via a frame buffer to the respective electrodes associated with the piezoelectric transducer can cause the front or proximate end of the optical fiber(s) to oscillate or vibrate. A size of vibrations may be controlled via the applied drive signals to obtain any or a variety of at least bi-axial patterns. The patterns created may be a raster scan pattern, spiral scan pattern, volute scan patter, or a Lissajous or a FIG. 8 scan pattern.

Multicore fibers may be configured to play a role in display resolution enhancement (i.e., higher resolution). For example, in one embodiment, if separate pixel data is sent down a tight bundle of 19 cores in a multicore fiber, and that cluster is scanned around in a sparse spiral pattern with the pitch of the spiral being approximately equal to the diameter of the multicore, then sweeping around will effectively create a display resolution that is approximately 19× the resolution of a single core fiber being similarly scanned around.

Indeed, it may be more practical to have the fibers more sparsely positioned relative to each other, because it is an efficient tiling/hex pattern; other patterns or numbers may be utilized; for example, a cluster of 19; the configuration is scalable up or down) of 3 fibers each housed within a conduit. With a sparse configuration, scanning of the multicore scans each of the cores through its own local region, as opposed to a configuration wherein the cores are all packed tightly together and scanned (wherein cores end up overlapping with scanning; if the cores are too close to each other, the numerical aperture ("NA") of the core is not large enough and the very closely packed cores end up blurring together somewhat and not creating as discriminable a spot for display). Thus, for resolution increases, it may be preferable to have sparse tiling rather than highly dense tiling. More details about the functioning of FSDs are described in U.S. patent application Ser. No. 14/555,585, incorporated by reference above.

Thus, the FSD (1420) and FSD circuitry (1410) may be used as a compact spatial light modulation with high resolution and brightness. It should be appreciated that due to small spot size, FSDs are typically coupled to a pupil expander like an entrance pupil expander or orthogonal pupil expander (not shown). Although the current embodiment describes the spatial light modulator to be an FSD, it should be appreciated that other embodiments may similarly use any other spatial light modulator (e.g., DLP, LCD, OLED, LCOS, etc.).

As shown in FIG. 15, the AR system (1400) also comprises coupling optics (1422) to direct the light from the FSD (1420) to the waveguide assembly (1430). The coupling optics (1422) may refer to one more conventional lenses that are used to direct the light into the waveguide assembly (1430). In one or more embodiments, a switching element (not shown) may be included that switch-ably directs light to a particular waveguide of the waveguide assembly (1430).

The waveguide assembly (1430) is then configured to project the image at a desired depth plane(s), as shown in FIG. 14. The AR system (1400) may also include an eye-tracking subsystem (1450) that is configured to track the user's eyes and determine the user's focus.

In one embodiment, only one waveguide having a particular DOE grating may be turned on, based on input from the eye-tracking subsystem (1450). In other embodiments, multiple waveguides having respective DOE gratings may be turned on simultaneously, as will be discussed below.

In one embodiment, the AR system (1400) may work as a multi-plane focus system, like the AR system (600) described above. In other words, all six DOE elements (e.g., all six waveguides of the waveguide assembly (1430)) may be turned on simultaneously, such that six fixed depth planes are generated in rapid succession with the FSD (1420) rapidly conveying image information to waveguide 1, then waveguide 2, then waveguide 3 and so on.

For example, a portion of the desired image, comprising an image of the sky at optical infinity may be injected at time 1 and the diffraction grating retaining collimation of light may be utilized; then an image of a closer tree branch may be injected at time 2 and a DOE configured to create a depth plane 10 meters away may be utilized; then an image of a pen may be injected at time 3 and a DOE configured to create a depth plane 1 meter away may be utilized. This kind of paradigm can be repeated in rapid time sequential fashion such that the eye/brain perceives the input to be all part of the same image, and such that the multiple image planes/slices are perceived almost simultaneously by the user.

As discussed above, the stacked configuration (1430) may utilize dynamic waveguides (rather than static waveguides and lenses) to provide multi-planar focusing simultaneously. For example, with three simultaneous focal planes, a primary focus plane (based upon measured eye accommodation, for example) could be presented to the user, and a + margin and − margin (i.e., one focal plane closer, one farther out) could be utilized to provide a large focal range in which the user can accommodate before the planes need be updated. This increased focal range can provide a temporal advantage if the user switches to a closer or farther focus (i.e., as determined by accommodation measurement). Then, the new plane of focus could be made to be the middle depth of focus, with the + and − margins switching over to either one while the AR system corrects for a change in accommodation.

However, this scenario assumes that the FSD (1420) is able to operate fast enough to rapidly generate different images/portions of the images to be injected into multiple waveguides. In another embodiment (not shown), each of the waveguides having respective diffraction elements may receive light through a separate FSD (e.g., six different FSDs, each injecting light onto a respective waveguide corresponding to a particular depth plane).

In other words, each FSD operates at a reasonable speed, such that DOE 1 is injected with light from FSD 1 which carries the image of the sky, DOE 2 is injected with light from FSD 2 which carries the image of the tree branch, DOE 3 is injected with light from FSD 3, which carries the image of the pen, and so on. Thus, by having multiple FSDs, instead of a single FSD rapidly generating all the images to be fed into all six of the waveguides (and switched or directed to a respective waveguide), each FSD need only to operate at a reasonable speed enough to inject light associated with its images only to its respective waveguide. However, this approach, although ideal from an optics point of view, may prove to be unwieldy to implement on a compact wearable AR system.

To this end, the eye-tracking system (1450) may be utilized such that a desired depth plane (or planes) coincides with the user's depth of focus. This embodiment functions somewhat similar to the variable plane focus system (e.g., FIG. 11) discussed above. In the context of the AR system (1400), based on input from the eye-tracking system (1450), a particular waveguide may be turned on such that the image is generated at a desired depth plane that coincides with the user's focus.

For example, if it is determined that the user's eyes are parallel to each other (i.e., focused at infinity), the AR system may turn on the waveguide having the DOE that is configured to deliver collimated light to the user's eyes, such that the virtual image appears at optical infinity, coinciding with the user's current state of focus. In another example, if the eye-tracking sub-system (1450) determines that the user's eyes are diverging to a focus that is at a distance of 1 meter, another waveguide having another DOE that is configured to focus approximately within that range may be turned on instead. It should be appreciated that, in this particular embodiment, only one waveguide is turned on at any given time (e.g., per frame), while the rest of the DOEs are turned off.

Or, in another embodiment, two waveguides having DOEs whose corresponding depth planes are situated close together may be simultaneously turned on, similar to the hybrid AR system (1200) described above.

In yet another embodiment, to increase the field of view of user's optics, a tiling approach may be employed such that two (or more) sets of stacked DOEs waveguides are used, each having a corresponding FSD (or any other type of spatial light modulator). Thus, one set of stacked waveguides and a corresponding FSD may be used to deliver virtual content to the center of the user's eye, while another set of stacked waveguides and another corresponding FSD may be used to deliver virtual content to the periphery of the user's eyes.

Similar to the above, each stack of waveguides may comprise 6 waveguides having different DOEs each for each of the 6 depth planes. Using both stacks together, the user's field of view is significantly increased. Further, having two different stacks of DOEs and FSDs gives more flexibility such that slightly different virtual content may be projected in the periphery of the user's eyes when compared to virtual content projected to the center of the user's eyes. More details on the tiling approach are described in concurrently filed U.S. Provisional Patent Application Ser. No. 62/005,865 entitled "Methods and systems for displaying stereoscopy with a freeform optical system with addressable focus for virtual and augmented reality" the content of the aforementioned U.S. application is hereby expressly incorporated by reference for all purposes.

It should be appreciated that the stacked DOEs/waveguides additionally function as an entrance pupil expander (EPE) to increase the numerical aperture of the FSD. Since the FSD produces light of a small diameter/spot size, the EPE expands the light within the waveguide such that it reaches the user's eyes. In other embodiments of the AR system (1400), the system may further comprise an orthogonal pupil expander in addition to an EPE to expand the light in both the x and y direction. More details about the EPEs and OPEs are described in the above referenced U.S. Provisional Patent Application Ser. No. 61/909,174 and U.S. Provisional Patent Application Ser. No. 62/005,807, incorporated by reference above.

Other types of pupil expanders may be similarly used in systems employed FSD. Although FSDs offer high resolution, brightness and are compact, FSDs tend to have a small numerical aperture (i.e., small spot size). Thus, systems that use FSDs as the spatial light modulator typically employ some type of pupil expander that essentially works to increase the numerical aperture of the generated light. While some systems may use waveguides that function as EPEs and/or OPEs to expand the narrow beam of light generated by FSDs, other embodiments may use diffusers to expand the narrow beam of light.

In one or more embodiments, a diffuser may be created by etching the end of the fiber to create small bits of terrain that scatter light; in another variation a bead or sandblasting technique, or direct sanding/scuffing technique may be utilized to create scattering terrain. In another variation, an engineered diffuser, similar to a diffractive element, may be created to maintain a clean spot size with desirable NA, which ties into the notion of using a diffractive lens. In other variations, a stack of PDLC diffusers may be used to increase the numerical aperture of the light generated through the FSD.

In yet another embodiment of the AR system, the FSD may be used in a system similar to the AR system (500) or the AR system (800) described above. However, to accommodate the small spot size of the FSD, the system further comprises a set of PDLC diffusers that expand the light generated through the FSD.

Figure 16:
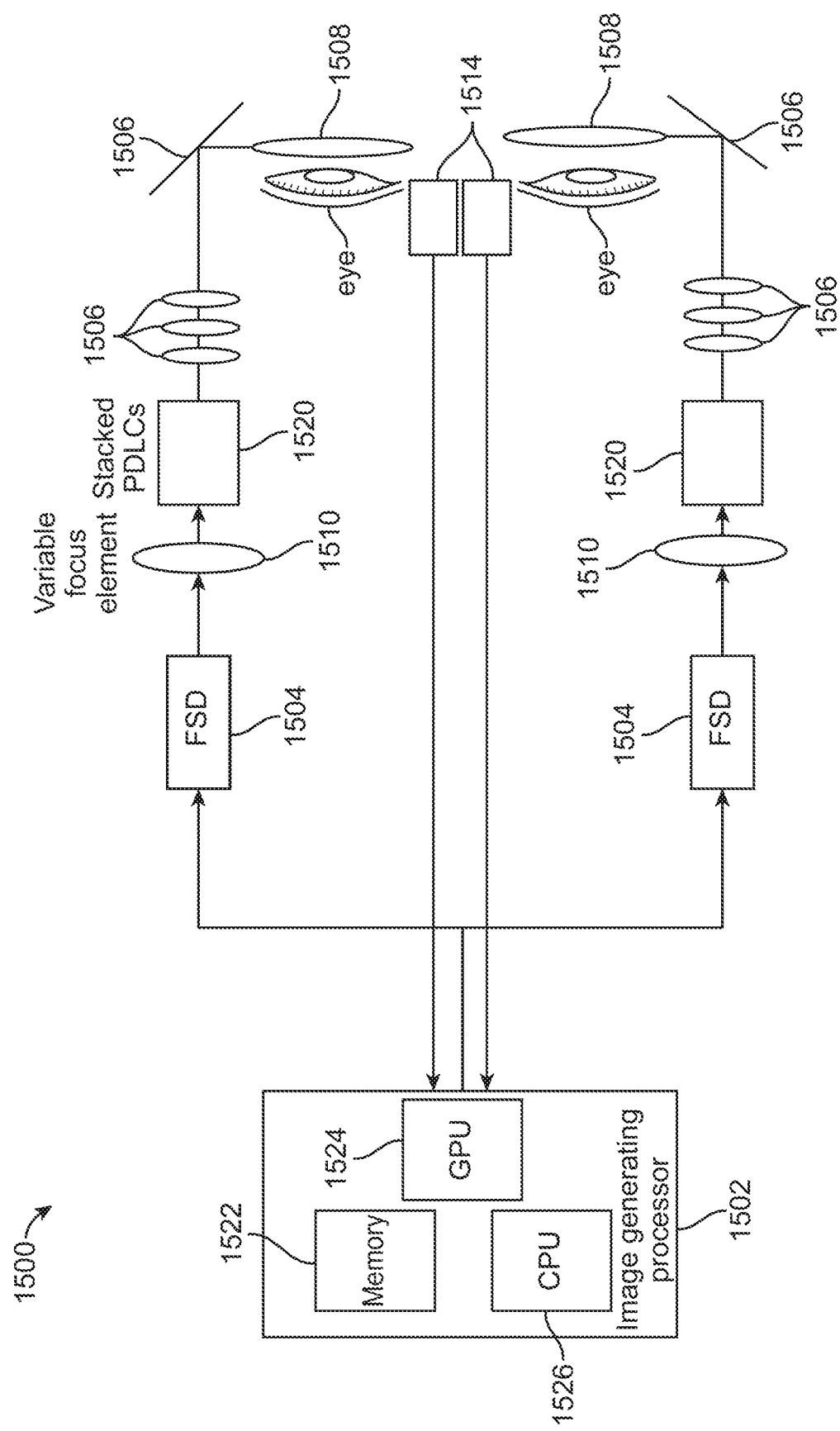
FIG. 16 illustrates a plan view of one embodiment of an AR system that includes a stacked PDLC diffuser arrangement to create a single or multiple depth planes.

Turning to FIG. 16, an example embodiment of an AR system (1500) (e.g., AR system (800) using FSD) using the set of PDLC diffusers will now be described. This particular embodiment of the AR system includes all the components of the variable plane focus system (e.g., AR system (800)) described above: the image generating process (1502) (e.g., comprising additional components: GPU (1524), memory (1522), CPU (1526), etc.), one or more VFEs (1510), a plurality of lenses/optical elements and mirrors (1506), a meniscus lens or eyepiece (1508), and an eye tracking subsystem (1514). The system also comprises an FSD (1504), and the system further includes a stacked PDLC diffuser arrangement (1520). Although not shown, FSD (1504) may also comprise standard FSD circuitry (not shown) and other circuitry to communicate with the image generating processor (1502), similar to that illustrated in FIG. 15.

The stacked PDLC diffusers (1520) comprise one or more layers of PDLC diffusers. Each PDLC diffuser of the stack of PDLC diffusers (1520) is configured to diffuse the focused light generated from the VFE (1510) and increase the numerical aperture of the generated light beam. However, it may be difficult to predict where the VFE (1520) may focus the beam. Thus, rather than using a single PDLC diffuser, the system includes a set of stacked PDLC diffusers (1520) to expand the image within a range of where the VFE might focus. It should be appreciated that the stack of PDLC diffusers (1520) may be dynamically turned on and off, such that only one layer of the stack of PDLCs is turned on at any given point in time (e.g., per frame). The remaining components of the AR system (1500) function similarly to components described above with respect to previously described systems, and will not be described again, for the purposes of brevity.

Figure 17:
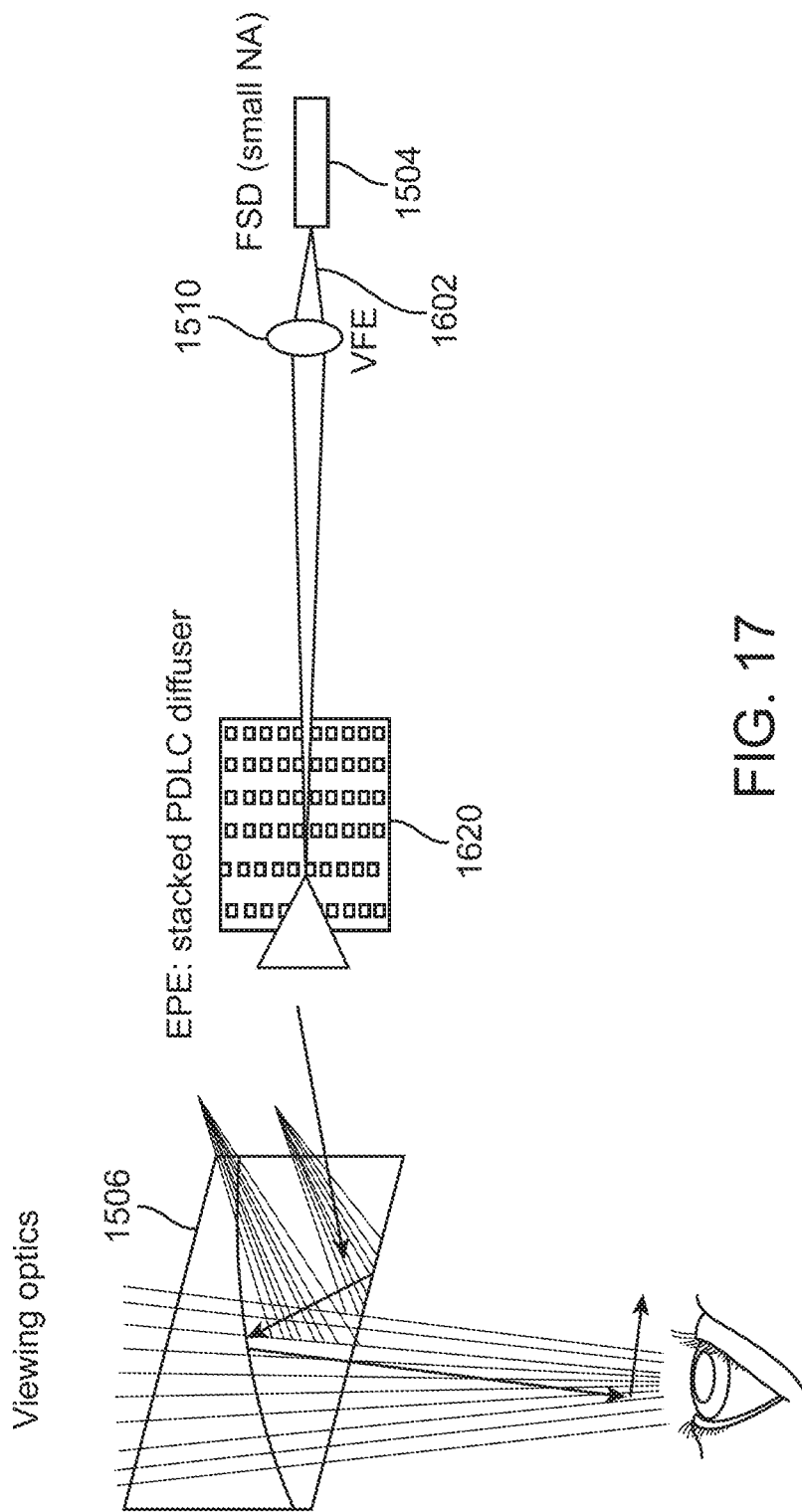
FIG. 17 illustrates an example embodiment of increasing a numerical aperture of a light beam through the stacked PDLC diffuser arrangement of FIG. 15.

More particularly, referring now to FIG. 17, a light beam (1602) having a small NA is output by the FSD (1504) and focused as desired by the VFE (1510). The focused light hits a particular PDLC diffuser layer (1520) as shown in FIG. 17 (in the illustrated embodiment, the light hits the fifth PDLC layer), which then acts as an expander (e.g., EPE) to increase the numerical aperture of the focused light beam. The focused and expanded light beam then goes through a set of optical lenses/mirrors (1506) to generate the image at a desired focal plane. Each PDLC layer has both a diffusive and transparent mode, which may be modulated by applying a voltage to the particular PDLC layer. In one or more embodiments, only a single PDLC layer is under the diffusive mode per frame, while the remaining layers are in transparent mode. Other embodiments may simultaneously activate two or more PDLC layers at one time (e.g., per frame).

As is the case above, the number of stacked PDLCs layers corresponds to the number of depth planes desired (e.g., six, as shown in FIG. 17). The rest of the optics system (lenses, beamsplitters, etc.) function in a manner similar to the other system (e.g., the AR system (800)) described above, and will not be described again, for the purposes of brevity.

Figure 1:
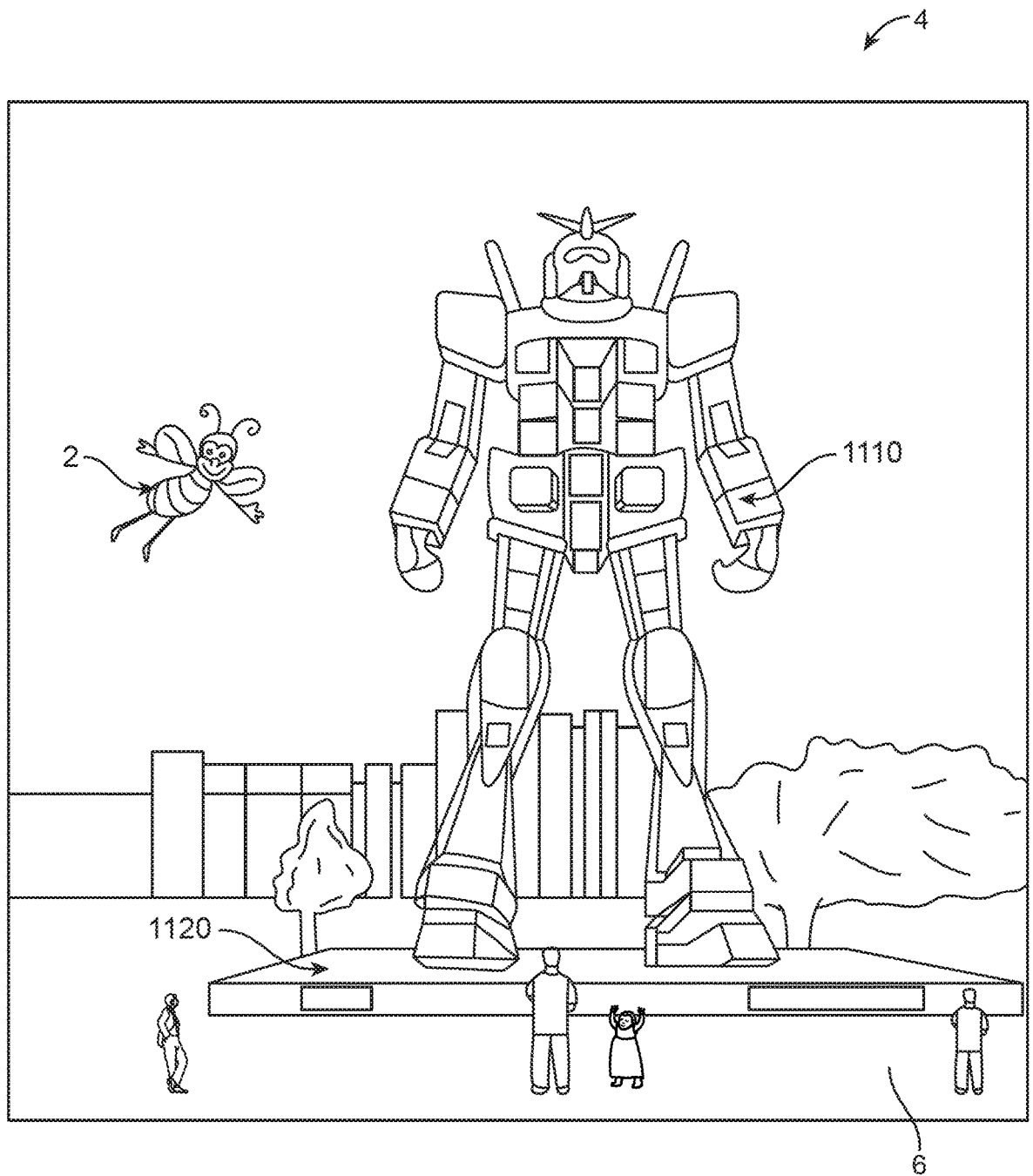
FIG. 1 illustrates a user's view of augmented reality (AR) through a wearable AR user device, in one illustrated embodiment.
Figure 2A:
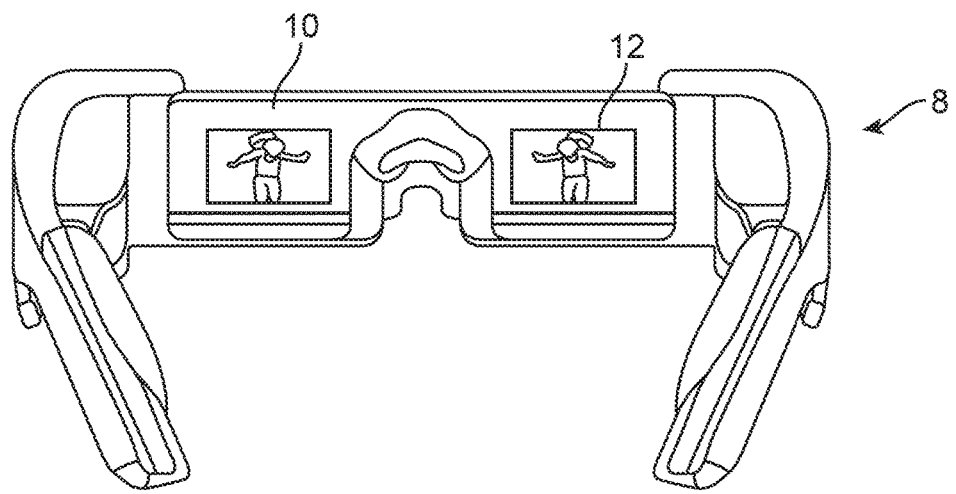
FIGS. 2A-2E illustrates various embodiments of wearable AR devices.
Figure 2B:
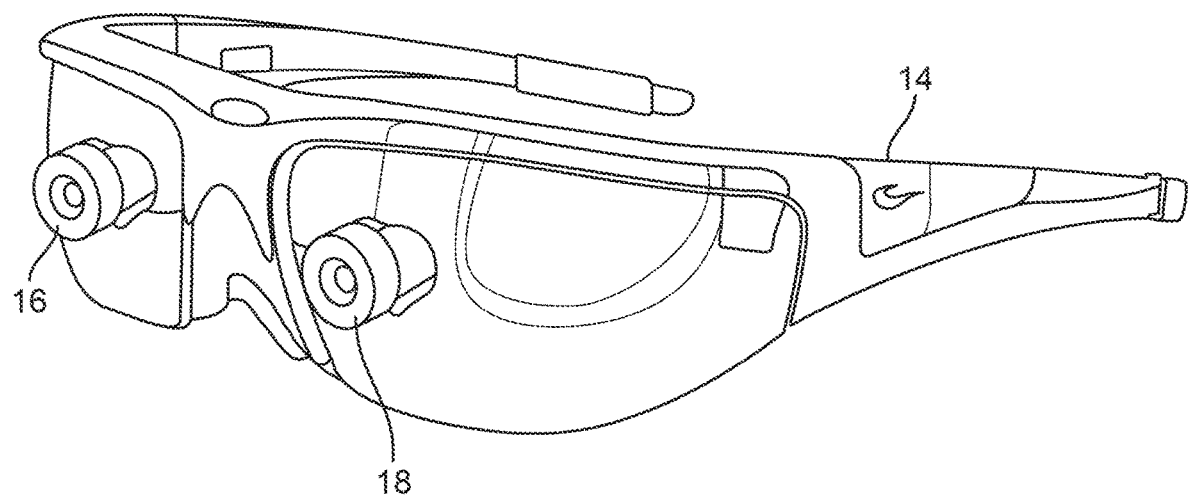
Figure 2C:
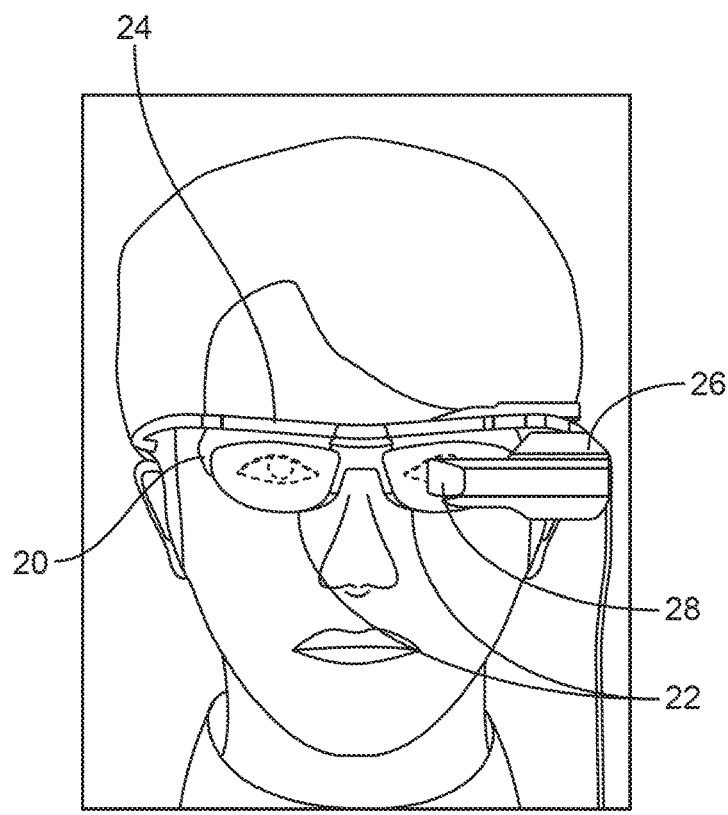
Figure 2D:
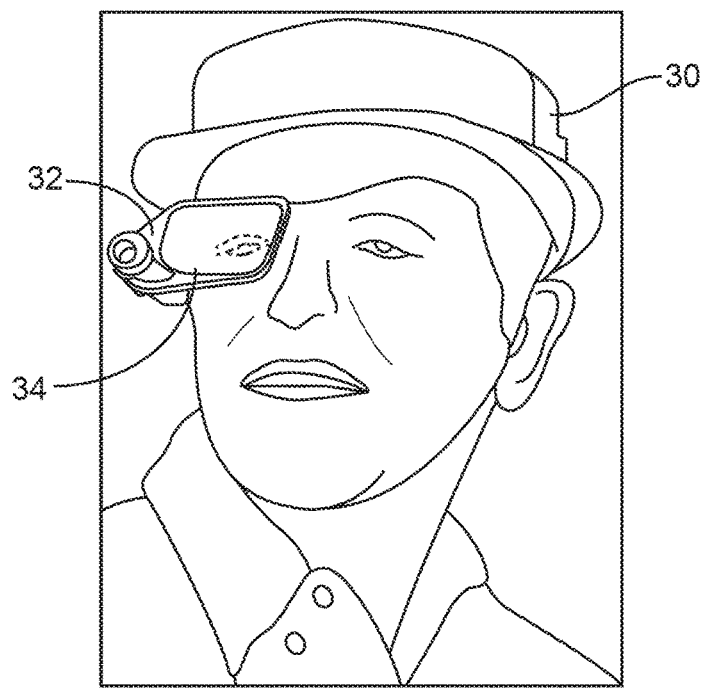
Figure 2E:
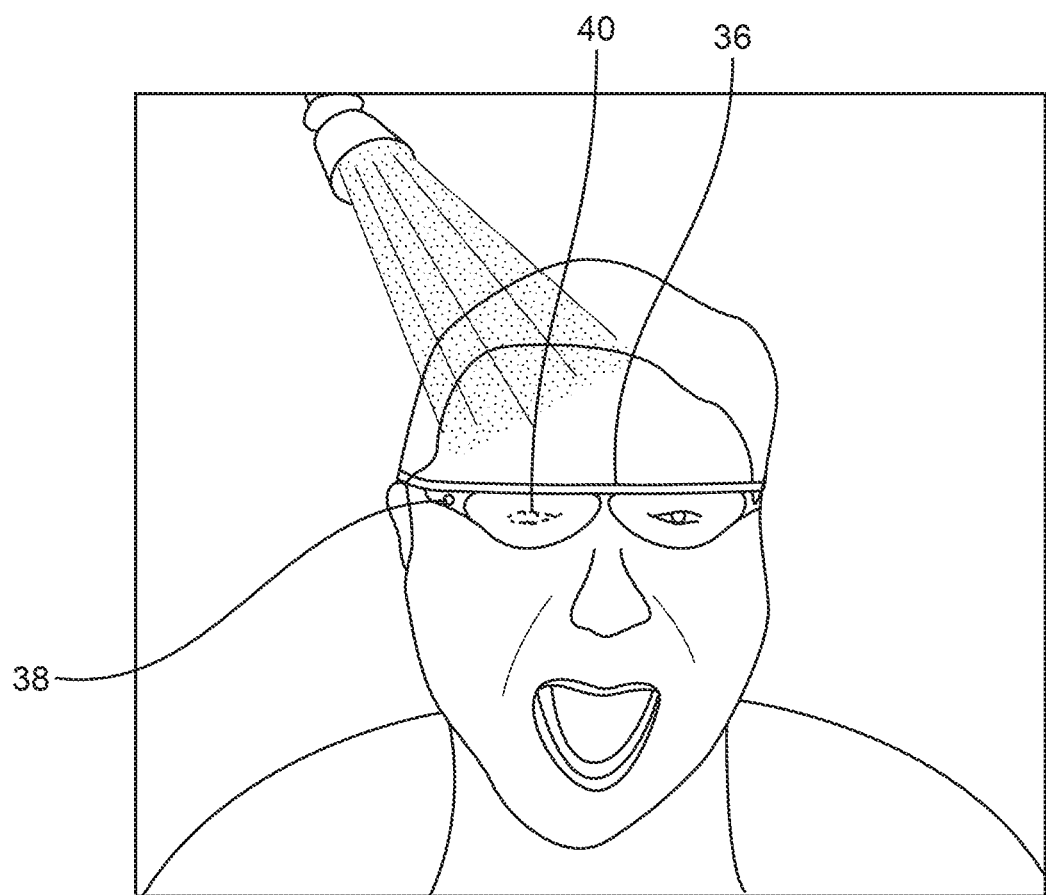
Figure 3:
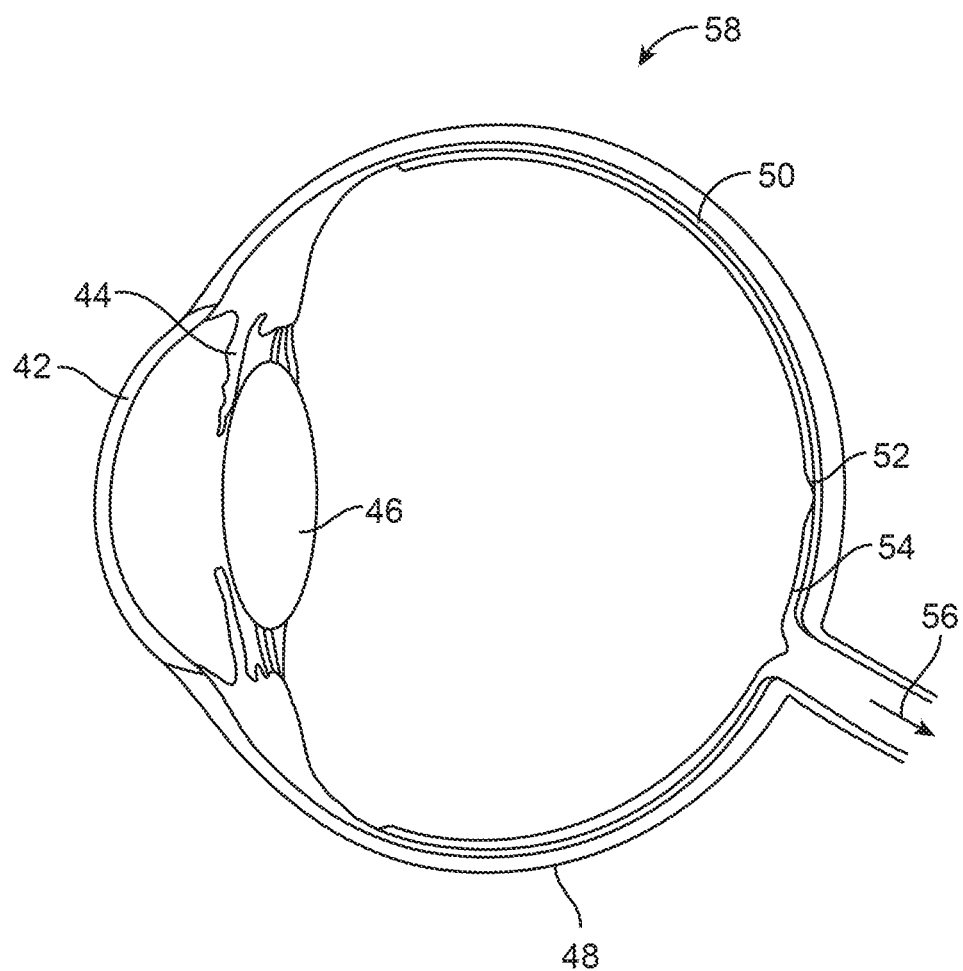
FIG. 3 illustrates a cross-sectional view of the human eye, in one illustrated embodiment.

In one embodiment, the AR system (1500) may work as a multi-planar focal system similar to the AR system (500) such that the VFE creates fixed depth planes, each of which is appropriately expanded by a corresponding PDLC layer. This requires an FSD that is configured to generate image information at a high frame rate (e.g., similar to the 360 Hz DLP of FIG. 1) and a VFE that is able to rapidly switch focus such that different focal planes are created in rapid succession (e.g., similar to the deformable mirror membrane VFE of the AR system (500)). Assuming both the above requirements are met, this system may function as a multi-planar focal system such that depth plane 1 is generated, followed by depth plane 2, followed by depth plane 3, and so on. This also, of course, assumes that the PDLC stack is able to rapidly switch various layers on and off to keep up with the fast VFE. As was the case in the AR system (500), the fixed depth planes are created so rapidly that the user perceives this as multiple focal planes being generated at the same time.

However, referring back to FIG. 16, in another embodiment, the system may use the eye-tracking subsystem (1514) to determine the user's focus and only turn on the PDLC layer that coincides with the users' focus. Thus, a system such as this may work as a variable plane focus system, similar to the AR system (800) described above such that only a single depth plane is created at any given point of time. For example, assuming the eye-tracking subsystem (1514) determines that the user's eyes are focused at optical infinity, the VFE (1510) may focus the image light beam generated by the FSD accordingly.

This focused light beam then hits a particular layer of the stacked PDLCs (1520) to create an expanded light beam, which then goes through the remaining optics before reaching the user's eye. Thus, when operating in a variable focal plane manner, the eye-tracking subsystem is used to determine which layer of the PDLC layer should be turned on to accordingly expand the focused light beam coming from the VFE.

In all the various AR systems described, it is obvious that the speed and functioning of the VFE is directly related to the efficiency of generating one or more depth planes such that user can perceive virtual objects in 3D. Although the VFE used in the AR system (500) (e.g., deformable mirror membrane VFE) is fast and is able to change focus planes at a rapid pace, it is exceedingly thin and fragile, as described above, and thus poses a challenge when used in wearable versions of the AR system. The VFEs used in the AR system (800), although less fragile, are not capable of the rapid change in focus as the membrane lens VFE, and thus lead to generation of a single depth plane rather than six depth planes, and require the use of eye tracking systems.

Additionally, with current VFEs, there is typically a settling time that causes a lag while the VFE is changing focus. This may be partly because VFEs tend to be elastic in nature, and may naturally move or shake (e.g., 1 milliseconds settling time) in the presence of air/natural environment when changing focus at a rapid pace. The settling time may have a direct effect on the speed and efficiency of the VFE. Thus, a VFE that is capable of rapid change, but is not overly fragile may be useful in AR systems.

Figure 18:
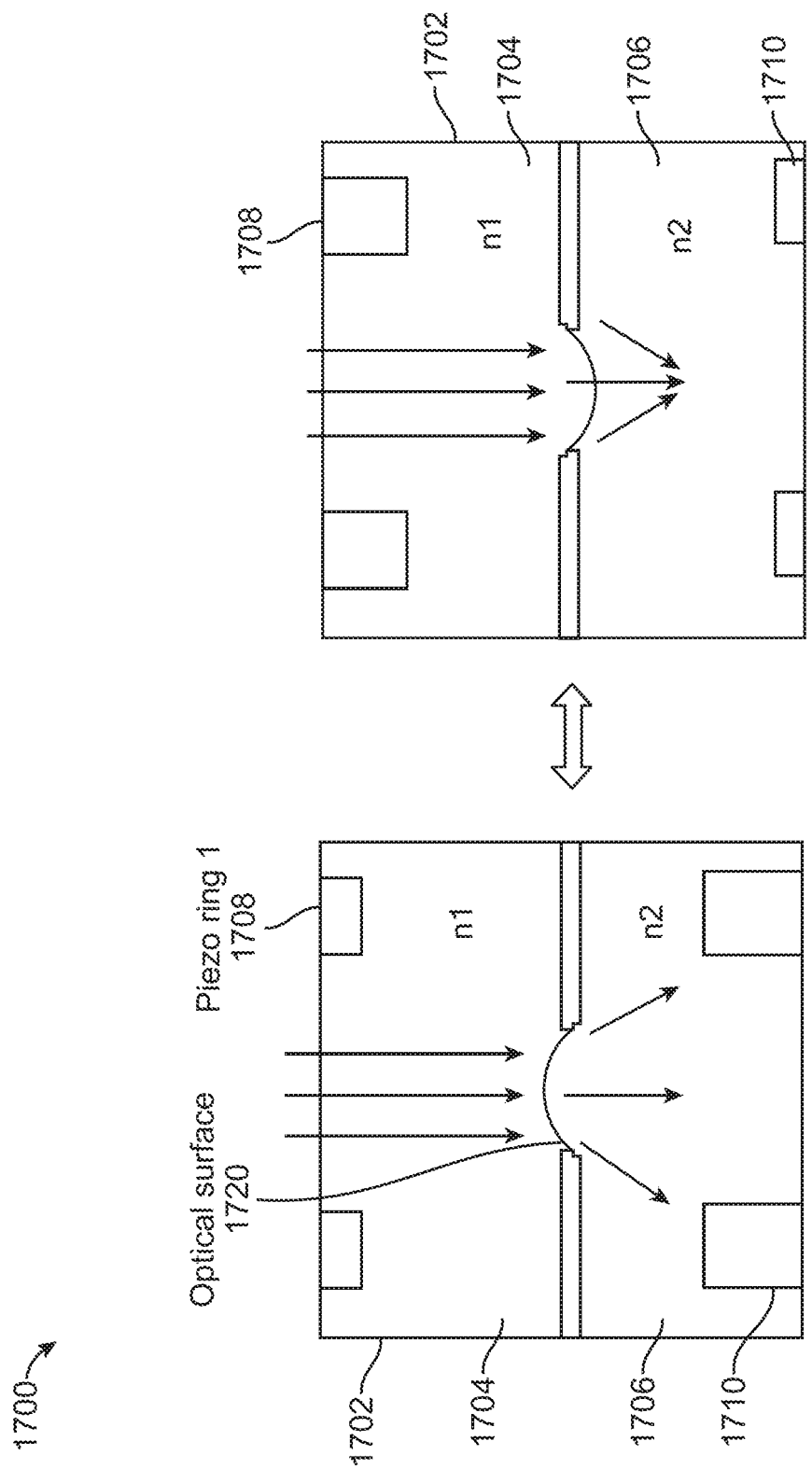
FIG. 18 illustrates an example embodiment of a mechanical wetting lens VFE.

To this end, a mechanical wetting lens VFE that is driven by piezo material may be created to reduce settling time and to increase the efficiency of the VFE. Referring to FIG. 18, the mechanical wetting lens VFE (1700) includes a sealed lens chamber (1702), two immiscible liquids (1704) and (1706) that contain different refractive indices n1 and n2, a first piezo ring (1708) and a second piezo ring (1710).

The sealed lens chamber (1702) holds the immiscible liquids (1704) and (1706) and the piezo rings (1708) and (1710). In one or more embodiments, the sealed lens chamber (1702) is devoid of any air, such that the mechanical wetting lens (1700) is minimally affected by the outside environment. The immiscible liquids (1704) and (1706) may be selected based on their immiscibility and their respective refractive indices n1 and n2. The type of liquid chosen may vary based on the application of the VFE (1700).

As shown in FIG. 18, the interface between the liquids (having the refractive indices n1 and n2) works as the optical surface or optical interface (VFE) (1720) that may be focused as desired. In other words, the optical interface (1720) itself functions as a VFE, and may be used to rapidly switch focus, by applying different degrees of pressure through the piezo rings.

As illustrated, the shape of the optical surface (1720) may be varied by applying pressure through the pair of piezo rings (1708) and (1710). Given that the volume of the immiscible liquids remains constant, the shape (e.g., curvature) of the optical interface (1720) necessarily changes when the size of the piezo rings is changed. Changing the size of the piezo rings (1708) and (1710) changes the distribution of liquids n1 and n2, thereby changing the curvature of the liquids interface. Thus, by controlling the piezo rings (1708) and (1710), the curvature of the optical surface (1720) may be varied as desired.

For example, as shown in FIG. 18, on the left side, the size of piezo ring (1710) is larger than piezo ring (1708). Therefore, liquid n2 is pushed up, creating a curvature in the optical surface (1720). Similarly, on the right side, the size of the piezo ring (1708) is increased, while (1710) remains small. Thus, liquid n1 pushes down creating an opposite curvature of the optical surface (1720).

Figure 19:
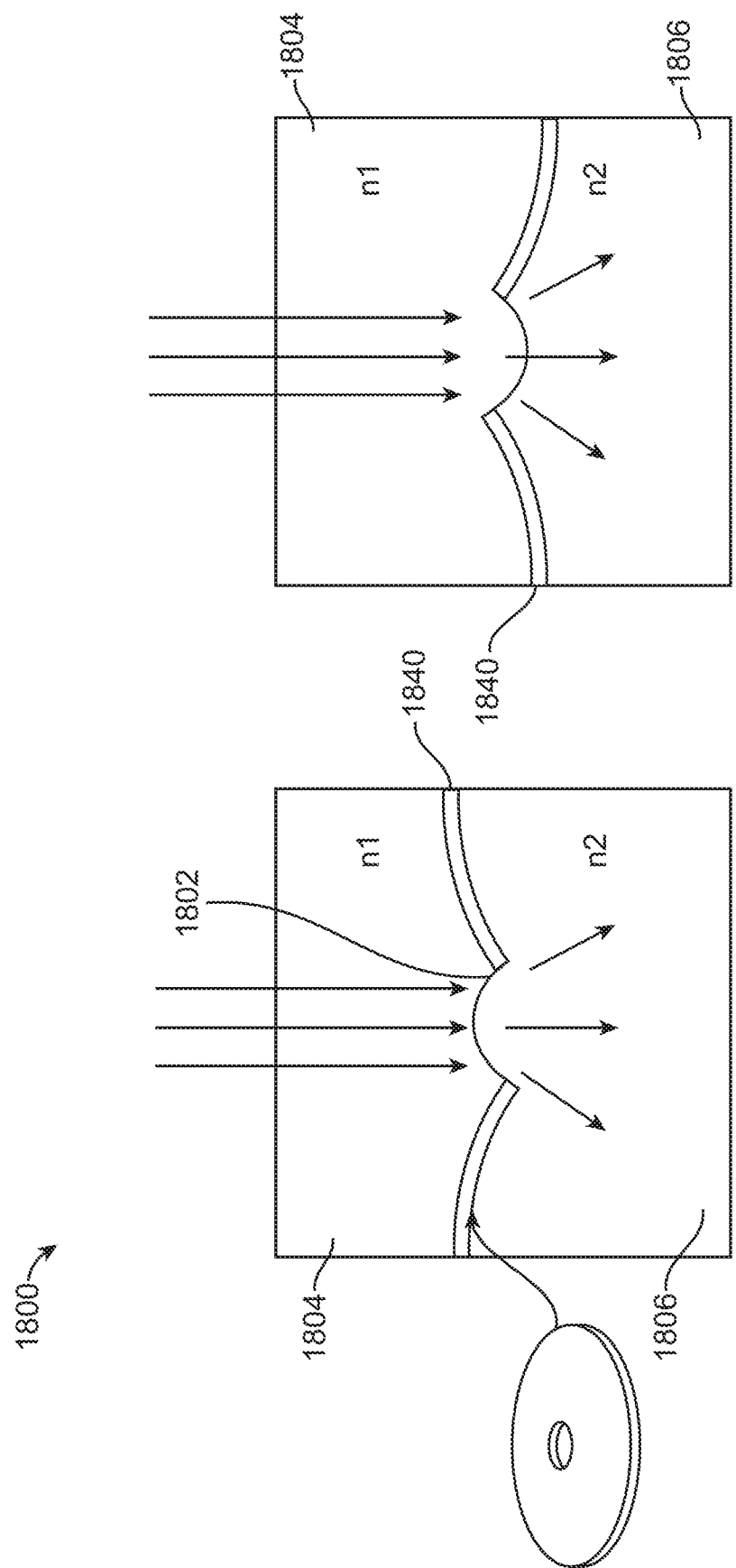
FIG. 19 illustrates another example embodiment of the mechanical wetting lens VFE.

In yet another embodiment, rather than using two piezo rings (e.g., FIG. 18), another embodiment (1800) of the mechanical wetting lens VFE may instead use a single ring bender (1840) as shown in FIG. 19. Referring to FIG. 19, immiscible liquid n1 and n2 are similarly separated by the ring bender (1840). However, rather than increasing the size of the piezo rings, the ring bender may be bent to various degrees to change the curvature of the optical surface (1820). For example, on the left side, the ring bender (1840) is bent such that the inner portion of the ring is pushed down. This causes liquid n2 to push up on the optical surface (1820) creating a curvature as shown in FIG. 19, left side. Similarly, on the right side, when the ring bender (1840) is bent such that the outer portion of the ring is pushed down, liquid n1 pushes down on the optical surface creating a different curvature as shown in FIG. 19, right side. It is anticipated that the mechanical wetting lens VFE (1700 or 1800) may be used in any of the AR systems described above instead of a standard VFE (e.g., the AR system (500), the AR system (800), the hybrid system (1200) or the AR system (1500)).

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method of displaying augmented reality, comprising:
projecting light associated with a first frame of image data;
focusing the light associated with the first frame of image data at a first depth plane;
projecting light associated with a second frame of image data;
focusing the light associated with the second frame of image data at a second depth plane, wherein the first depth plane is different from the second depth plane, and wherein the first depth plane and the second depth plane, when viewed by a user, are perceived simultaneously;
tracking a vergence of the user's eyes, wherein the light is focused based at least in part on the tracked vergence;
activating at least one PDLC diffuser of a plurality of switchable polymer-dispersed liquid crystal (PDLC) diffusers; and
increasing a numerical aperture of the light associated with the first or second frames of image data using the at least one activated PDLC diffuser, wherein the number of PDLC diffusers in the plurality corresponds to a number of depth planes to which the light associated with the first or second frames of image data can be focused, wherein the first depth plane corresponds to a first distance away from the user in a z direction, wherein the second depth plane corresponds to a second distance away from the user in the z direction, and wherein a gap between the first depth plane and the second depth plane remains unchanged over time.

2. The method of claim 1, further comprising:
projecting light associated with a third frame of image data;
focusing the light associated with the third frame of image data at the first depth plane.

3. The method of claim 1, wherein the first depth plane corresponds to optical infinity.

4. The method of claim 1, wherein the first frame of image data and the second frame of image data are consecutive frames.

5. The method of claim 1, wherein the focus of the first and second frames of image data are varied on a frame-by-frame basis.

6. The method of claim 1, further comprising delivering the focused light to a user's eyes.

7. The method of claim 1, wherein the first and second frames of image data comprise slices of a three-dimensional scene.

8. The method of claim 1, wherein the first and second frames of image data are provided in a time-sequential manner.

9. The method of claim 1, wherein the first depth plane corresponds to optical infinity, and the second depth plane corresponds to a depth plane closer than optical infinity.

10. The method of claim 1, wherein the projected light is focused through a variable focus element.

11. The method of claim 10, wherein the variable focus element is a deformable membrane mirror.

12. An augmented reality display system, comprising:
a spatial light modulator operatively coupled to an image source for projecting light associated with one or more frames of image data;
an eye tracking system to determine a focus of a user's eyes;
a variable focus element (VFE) coupled to a set of optics for focusing at least a frame of the one or more frames of image data on a depth plane based at least in part on the focus of the user's eyes; and
a plurality of switchable polymer-dispersed liquid crystal (PDLC) diffusers to increase a numerical aperture of the light associated with one or more frames of image data,
wherein the number of PDLC diffusers in the plurality corresponds to a number of depth planes in which the system is configured to generate images.

13. The augmented reality display system of claim 12, further comprising a blurring module for variably blurring out one or more virtual objects corresponding to the one or more frames of image data based at least in part on a distance at which the depth plane is projected, and wherein the one or more virtual objects correspond to a different depth as compared to the depth plane.

14. The augmented reality display system of claim 13, wherein a plurality of frames of image data are projected at the depth plane, and wherein at least a portion of one of the frames of the plurality of frames of image data is blurred.

15. The augmented reality display system of claim 12, wherein the spatial light modulator comprises a Digital Light Processing system (DLP).

16. The augmented reality display system of claim 15, wherein the DLP operates at a power of 120 Hz.

17. The augmented reality display system of claim 12, wherein the VFE comprises an opto-refractive membrane lens.

18. The augmented reality display system of claim 12, wherein the spatial light modulator is a high refresh rate display.

19. The augmented reality display system of claim 12, further comprising a set of optical elements to deliver the focused light to a user's eyes.

20. The augmented reality display system of claim 12, wherein the one or more frames of image data comprise slices of a three-dimensional scene.

21. The augmented reality display system of claim 12, wherein the one or more frames of image data are provided in a time-sequential manner.

22. The augmented reality display system of claim 12, wherein the depth plane is moved within a range in a z direction based at least in part on the determined accommodation.

23. A method of displaying augmented reality, comprising:
determining a focus of a user's eyes;
projecting light associated with a frame of image data;
focusing the light associated with the frame of image data to generate a depth plane based at least in part on the determined focus of the user's eyes;
moving the depth plane within a range in a z direction based at least in part on a change in the focus of the user's eyes;
activating at least one PDLC diffuser of a plurality of switchable polymer-dispersed liquid crystal (PDLC) diffusers; and
increasing a numerical aperture of the light associated with one or more frames of image data using the at least one activated PDLC diffuser,
wherein the number of PDLC diffusers in the plurality corresponds to a number of depth planes to which the light associated with the frame of image data can be focused.

24. The method of claim 23, further comprising blurring one or more virtual objects in the frame of image data based at least in part on a distance at which the depth plane is generated, and wherein the one or more virtual objects correspond to a different depth as compared to the depth plane.

25. The method of claim 24, wherein a plurality of frames of image data are projected at the depth plane, and wherein at least a portion of one of the frames of the plurality of frames of image data is blurred.

26. The method of claim 23, wherein the light is projected through a spatial light modulator.

27. The method of claim 26, wherein the spatial light modulator comprises a Digital Light Processing system (DLP).

28. The method of claim 27, wherein the DLP operates at a frame rate of 120 Hz.

29. The method of claim 26, wherein the spatial light modulator is a high refresh rate display.

30. The method of claim 23, wherein the depth plane is generated at least in part through a variable focus element (VFE).

31. The method of claim 30, wherein the VFE comprises an opto-refractive membrane lens.

32. The method of claim 23, further comprising delivering the light to the user's eyes through a set of optical elements.

33. The method of claim 23, wherein the frame of image data comprises at least a slice of a three-dimensional scene.

34. The method of claim 33, wherein one or more frames of image data are provided in a time-sequential manner.

* * * * *